(12) United States Patent
Iesaka et al.

(10) Patent No.: US 6,828,548 B1
(45) Date of Patent: Dec. 7, 2004

(54) OPTICAL DISPLACEMENT MEASURING DEVICE

(75) Inventors: Tsutomu Iesaka, Sayama (JP); Sigehiro Fuwa, Tokorozawa (JP)

(73) Assignee: Citizen Watch Co., Ltd., Tokyo (JP)

( * ) Notice: Subject to any disclaimer, the term of this patent is extended or adjusted under 35 U.S.C. 154(b) by 278 days.

(21) Appl. No.: 10/111,540

(22) PCT Filed: Oct. 26, 2000

(86) PCT No.: PCT/JP00/07520

§ 371 (c)(1),
(2), (4) Date: Apr. 25, 2002

(87) PCT Pub. No.: WO01/31292

PCT Pub. Date: May 3, 2001

(30) Foreign Application Priority Data

| | | | |
|---|---|---|---|
| Oct. 26, 1999 | (JP) | ............................................ | 11-303877 |
| Dec. 22, 1999 | (JP) | ............................................ | 11-364052 |
| Sep. 18, 2000 | (JP) | ...................................... | 2000-281519 |
| Sep. 26, 2000 | (JP) | ...................................... | 2000-291385 |

(51) Int. Cl.[7] .............................................. G01D 5/34
(52) U.S. Cl. ........................... 250/231.13; 250/231.16; 250/237 G; 356/616
(58) Field of Search ....................... 250/231.13, 231.14, 250/231.16, 237 R, 237 G; 356/614, 615, 616, 617, 618, 619; 341/11, 13

(56) References Cited

U.S. PATENT DOCUMENTS 5,302,821 A * 4/1994 Igaki et al. ............. 250/237 G 5,981,942 A * 11/1999 Ieki ........................ 250/231.16

FOREIGN PATENT DOCUMENTS

| JP | 56-172712 | 12/1981 |
|---|---|---|
| JP | 4-44211 | 7/1992 |
| JP | 6-7062 | 1/1994 |
| JP | 6-18288 | 1/1994 |

* cited by examiner

Primary Examiner—Kevin Pyo
(74) Attorney, Agent, or Firm—Finnegan, Henderson, Farabow, Garrett & Dunner, L.L.P.

(57) ABSTRACT

An optical displacement measurement apparatus increasing the valid light receiving area struck by light so as to give a larger signal and reducing the effect of any unevenness or spottiness of the illuminance of the light source or any scratches or dirt on the glass scale is provided. The apparatus has a plurality of light receiving element arrays having a plurality of light receiving elements, has a plurality of light receiving element groups having a plurality of light receiving element arrays, has the plurality of light receiving element arrays arranged shifted by predetermined distances in the direction of movement of the glass scale, and has the light receiving element groups arranged shifted by predetermined distances with respect to the direction of movement of the glass scale. At this time, it is possible to make the width of the valid light receiving portions larger than the width of the invalid light receiving portions, provide one or more light receiving element arrays having a plurality of light receiving elements, and provide a plurality of light receiving element groups having a plurality of light receiving element arrays.

5 Claims, 28 Drawing Sheets

PRIOR ART

PRIOR ART

PRIOR ART

PRIOR ART

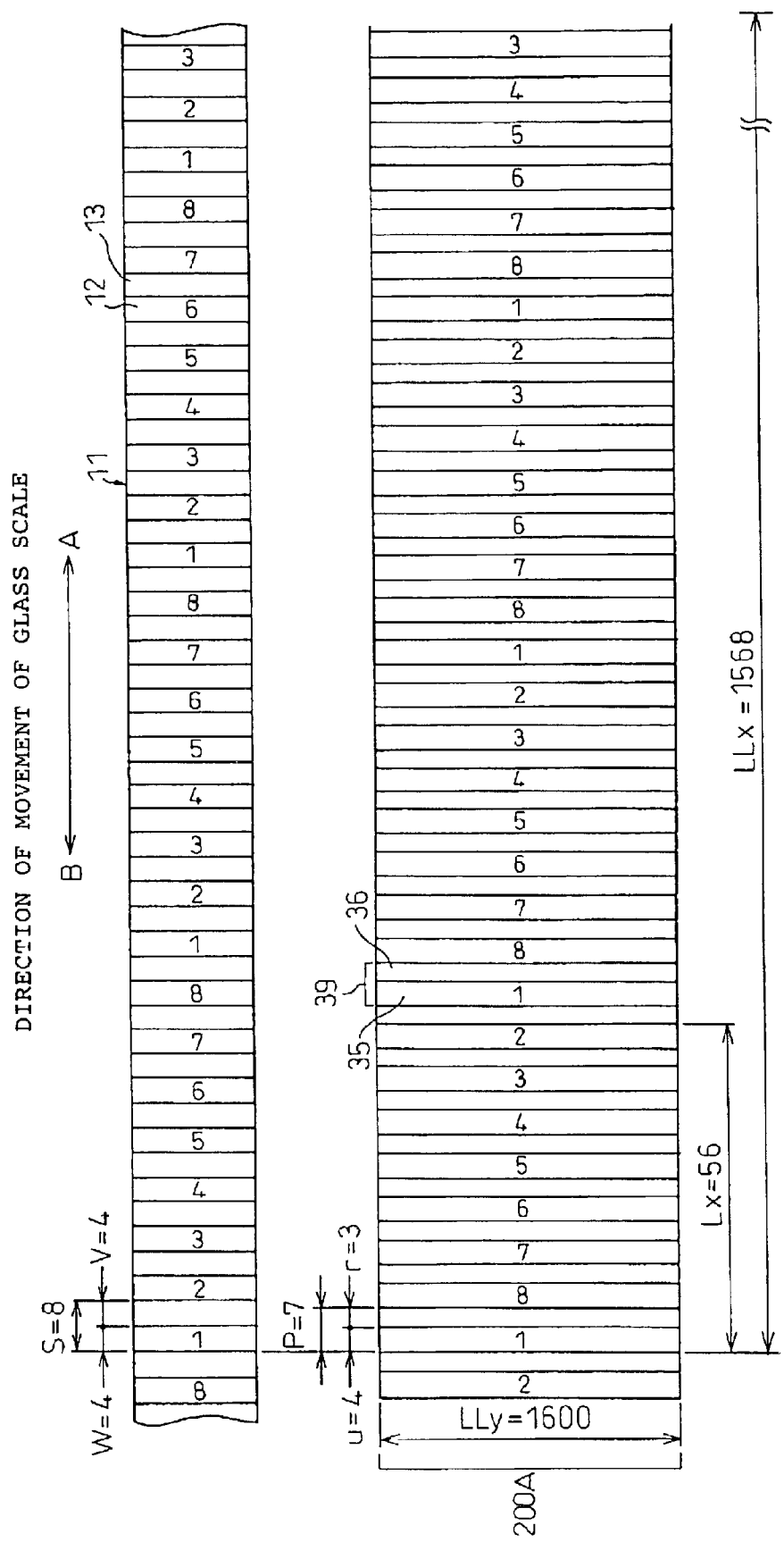

OPTICAL DISPLACEMENT MEASURING DEVICE

TECHNICAL FIELD

The present invention relates to an optical displacement measurement apparatus, more particularly relates to a high precision optical displacement measurement apparatus using a photoelectric transmission type linear encoder, used for a contact type digital displacement meter.

BACKGROUND ART

In the past, optical measurement devices using lasers or light emitting diodes (LED) and optical measurement devices using optical encoders have been known. Optical measurement devices can achieve a high precision since they use as units of measurement the wavelengths of the lasers or LEDs. Further, optical measurement devices are mainly used for measuring the length between two points, i.e., measuring relative position. Optical encoder measurement devices are comprised of a scale made of a glass plate, film, metal sheet, etc., an optical grid provided at a predetermined pitch from the scale, a fixed index grid arranged facing the scale across a predetermined distance (the phase of the optical grid and the phase of the fixed index grid being shifted 90 degrees), a fixed light source for emitting parallel light to the scale, and a light receiving sensor. When the scale moves, the optical grid and fixed index grid overlap with each other to produce differences in lightness are produced. The light receiving sensor detects the difference in lightness. Optical encoder measurement devices are being used commercially as digital displacement meters and are mainly being used for measuring the length between two points, i.e., measuring relative position.

Below, optical encoder measurement devices of the prior art will be explained with reference to the drawings.

FIG. 1 shows the state of use of a contact type digital displacement meter 40 including a photoelectric transmission type linear encoder. The contact type digital displacement meter 40 is used connected to a counter 41 by a connection cable 7. The contact type digital displacement meter 40 is supplied with power from the counter 41 to perform measurement and outputs the measurement value to the counter 41. The counter 41 processes the signal output from the contact type digital displacement meter 40 and digitally displays the obtained measurement value on a display unit 42. Therefore, the displacement of an object measured by the contact type digital displacement meter 40 is displayed on the display unit 42 as a digital value.

The contact type digital displacement meter 40 has a frame 8 covered by an upper cover 9A and a lower cover 9B and has bearings 18 fastened at the two ends of the frame 8. The bearings 18 support a spindle 5. A contactor 6 is screwed into the front end of the spindle 5.

When measuring the length, thickness, etc., the contactor 6 screwed into the front end of the spindle 5 is brought into contact with the measured object. Displacement of the measured object causes the spindle 5 to move in the arrow direction. The displacement of the spindle 5 is detected by the photoelectric transmission type linear encoder built into the contact type digital displacement meter 40, the detection output is processed by the counter 41, and the displacement of the measured object is displayed on the display unit 42.

FIG. 2 explains the principle of a conventional photoelectric transmission type linear encoder built into the contact type digital displacement meter 40 explained in FIG. 1. The spindle 5 into which the contactor 6 is screwed has connected to it a moving scale 3 made of a transparent member. The moving scale 3 is formed with an equal pitch optical grid 11.

At one side of the moving scale 3 are provided a light source 1 and a condenser lens 2. At the other side are provided a fixed scale 34 formed with equal pitch optical grids 47 and 48 and light receiving elements, i.e., photodiodes 28. The light source 1 and the photodiodes 28 face each other across the moving scale 3 moving in accordance with displacement of the measured object and the fixed scale 34 fixed to a constant position.

The optical grid 11 provided at the moving scale 3 and the optical grids 47 and 48 provided at the fixed scale 34 have the same pitches and same line widths, for example, pitches of 20 $\mu$m and line widths of 10 $\mu$m. The two types of scales are fabricated to extremely high precisions.

At the time of measurement, the spindle 5 moves in the arrow direction. The amount of light passing through the scales becomes maximum when the transparent portions of the optical grid 11 of the moving scale 3 and the transparent portions of the optical grids 47 and 48 of the fixed scale 34 match. On the other hand, when the moving scale 3 moves by exactly ½ of the pitch of the optical grid from that state, the transparent portions and nontransparent portions of the optical grids overlap, so the amount of light transmitted becomes the minimum. That is, along with movement of the moving scale 3, the signals output from the photodiodes 28 become sinusoidal signals. By counting the number of their cycles, the distance of movement of the moving scale 3 can be found.

In general, the fixed scale 34 is normally provided with two optical grids 47 and 48. Corresponding to this, two photodiodes 28 are also provided. Further, one optical grid 47 is shifted by exactly ¼ pitch from the other optical grid 48.

FIG. 3 shows the signals output from the two photodiodes 28 when the moving scale 3 moves. If expressing the light passing through one optical grid 47 of the fixed scale 34 as the signal A in FIG. 3, the signal B expressing the light passing through the other optical grid 48 of the fixed scale 34 is shifted in phase from the pitch P of the signal A by ¼ pitch. It is possible to determine the right or left direction of movement of the moving scale 3 by the advance or delay of the phase of the signal B with respect to the signal A.

FIG. 4 shows the configuration of a first prior art of a photoelectric transmission type linear encoder built into the contact type digital displacement meter 40 explained in FIG. 1. A cross-section of the linear encoder is shown. The linear encoder is mainly provided with two LEDs 1 used as light sources, a moving scale 3, a spindle 5, a fixed scale 34, and two photodiodes 28.

The frame 8 has an upper cover 29A and lower cover 29B and a linear encoder support base 30 screwed to it. The spindle 5 is supported by two bearings 18 fastened to the frame 8. A contactor 6 for contacting the measured object is screwed into the front end of the spindle 5. The moving scale 3 is positioned with and fastened to a moving scale support base 31. The moving scale support base 31 is positioned with and fastened to the spindle 5, so movement of the spindle 5 becomes movement of the moving scale 3. The moving scale 3 is sandwiched between the light source LEDs 1 and condenser lenses 2 and the light receiving side fixed scale 34 and photodiodes 28.

For a stopping mechanism of the spindle 5, while not shown, a stopping rod is fastened to the spindle 5 at one end.

The other end slides in a groove provided in the frame 8 to thereby function as a stop. Further, the rod is linked with the frame 8 by a tension spring and is set to apply a suitable contact pressure to the measured object.

At the light emitting side, the two LEDs 1 are fastened to the LED support base 32. The condenser lenses 2 are fastened to the LEDs 1. The LED support base 32 is positioned with and screwed to the linear encoder support base 30 so as to facilitate positioning with the light receiving side. The two LEDs 1 and condenser lenses 2 sandwich the moving scale 3 between them and face the light receiving side fixed scale 34 and two photodiodes 28.

At the light receiving side, the two photodiodes 28 are set on a PCB (printed circuit board) 33. The PCB 33 is fastened to the linear encoder support base 30. The fixed scale 34 is set on the linear encoder support base 30 between the photodiodes 28 and the moving scale 3. Two sets of gradations are cut into it. As with the explanation of the principle in FIG. 2, the pitches and line widths of the two optical grids 47 and 48 provided at the fixed scale 34 are exactly the same as the optical grid 11 of the moving scale 3, but the gradations are shifted in relative position by exactly ¼ pitch corresponding to the two photodiodes 28.

When the spindle 5 moves and the moving scale 3 is moved due to measurement, the light from the LEDs 1 and condenser lenses 2 passes through optical grid 11 of the moving scale 3 to produce differences in lightness. When the transparent portions of the optical grid 11 match with the transparent portions of the optical grids 47 and 48 of the fixed scale 34, the light is bright, while when they are shifted in phase by 180°, the light becomes dark. The repetition of the differences in lightness of the light is detected by the photodiodes 28. As shown in FIG. 3, two sinusoidal signals A and B having the same period and having a 90 degree phase difference are output from the photodiodes 28 by the ¼ pitch shifted optical grids 47 and 48 of the fixed scale 3. These signals A and B are amplified and digitalized, then electrically divided and output as 1 μm pulses to enable measurement of the length.

FIG. 5 is a view of the configuration of a photoelectric transmission type linear encoder of a second prior art. The photoelectric transmission type linear encoder shown in FIG. 5 is comprised of a glass scale 10 (moving scale 3 of first prior art), an optical grid 11 provided on the glass scale 10, a light source 1 for emitting parallel light to the glass scale 10, fixed index grids 51 to 54 for receiving light passing through the glass scale 10, an index base 50 on which the fixed index grids 51 to 54 are provided, light receiving elements 61 to 64 for receiving the light passing through the fixed index grids 51 to 54, and a board 20 on which the light receiving elements 61 to 64 are provided. Further, the board 20 is provided with a semiconductor integrated circuit (IC) 22 and a terminal 21 for connecting with a cable 7C.

Note that the phases of the fixed index grids 51 to 54 are shifted in 90 degree increments with respect to the optical grid 11. Further, the light receiving elements 61 to 64 are comprised of single light receiving elements such as photosensors. The signals obtained are converted to length using the prior art of "interpolation" for converting voltage to distance.

FIG. 6 is a view of the configuration of an optical transmission type linear encoder of a third prior art. The optical transmission type linear encoder shown in FIG. 6 is comprised of a glass scale 10, an optical grid 11 provided on the glass scale 10, a light source 1 for emitting parallel light to the glass scale 11, a light receiving element array 37 for receiving the light passing through the glass scale 10, and a board 20 on which the light receiving element array 37 is provided. Further, the board 20 is provided with a semiconductor integrated circuit (IC) 23 and a terminal 21 for connecting with a cable 70.

FIG. 7 will be used to explain the configuration of the optical transmission type linear encoder of the third prior art in further detail. The light receiving element array 37 is comprised of a plurality of light receiving elements. $\underline{P}$ shows the pitch of the light receiving elements, $\underline{u}$ shows the width of the valid light receiving portion 35, and $\underline{r}$ shows the width of the invalid light receiving portion. Here, $\underline{P}$ is set to S×3/4, $\underline{u}$ to S/2, and $\underline{r}$ to S/4. That is, the ratio of $\underline{u}$ and $\underline{r}$ is 2:1.

Therefore, four light receiving elements g1, g2, g3, and g4 are provided corresponding to the three optical grids e1, e2, and e3. Further, the light receiving elements are configured so as to give the same amount of light for every four elements. Further, the phases of the four light receiving elements g1, g2, g3, and g4 are shifted by 90° increments. Therefore, lines are laid for each four light receiving elements and the values added. Here, the total of the added outputs from the valid light receiving portions a1, a2, a3 . . . of the light receiving elements 37 is designated as A, the total of the added outputs from the valid light receiving portions b1, b2, b3 . . . of the light receiving elements 37 as B, the total of the added outputs from the valid light receiving portions c1, c2, c3 . . . of the light receiving elements 37 as C, and the total of the added outputs from the valid light receiving portions d1, d2, d3 . . . of the light receiving elements 37 as D. This being so, the phases of the added output signals A, B, C, and D are shifted by 90 degree increments. The optical transmission type linear encoder of the third prior art measures length by processing the output signals A, B, C, and D. These output signals A to D are changed to length using the conventional interpolation technique.

In the above first prior art, however, since the difference in lightness due to the overlap of the moving scale 3 and the fixed scale 34 was detected by photodiodes 4, the fixed scale 34 was essential, the contact type digital displacement meter 40 could not be made thin, and therefore the contact type digital displacement meter 40 became large in size. Further, the distance between the moving scale 3 and the fixed scale 34 had to be made a narrow 10 to 50 μm, therefore there was the problem that adjustment for positioning the surfaces of two scales with each other was extremely difficult.

Further, the photoelectric transmission type linear encoder of the second prior art was comprised by a combination of the glass scale 10, fixed index grids 51 to 54 corresponding to the fixed scale 34 in the first prior art, and light receiving elements 61 to 64. The fixed index grids 51 to 54 were essential, so the contact type digital displacement meter 40 became large in size. Further, to perform measurement with a high precision, it was necessary to accurately set the distance between the index grids, the pitch of the fixed index grids 51 to 54, the ratio of transparent portions and nontransparent portions of the fixed index grids 51 to 54, the distance between the glass scale 10 and the fixed index grids 51 to 54, and the distance between the fixed index grids 51 to 54 and the light receiving elements 61 to 64.

Further, the light receiving elements 61 to 64 were comprised of single light receiving elements such as photosensors, so it was difficult to arrange them close to each other, a wide area was occupied, and the efficiency of use of the portion which the light struck was lowered.

On the other hand, in the third prior art, the size of the light receiving elements had to be fixed to S×3/4 and the width r of the invalid light receiving portions was set to S/4. It was not possible to further lower this.

Further, as problems common to the second and third prior arts, there were the problems of how to widen the valid light receiving portions of the light receiving elements to raise efficiency at the portion struck by light and what measures to take when the illuminance of the light source was spotty or when the glass scale was scratched or dirty.

That is, if the areas of the valid light receiving portions of the light receiving elements are small at the portion struck by the light, the outputs become smaller, there is susceptibility to noise, and there is a detrimental effect on the measurement precision. Further, when the illuminance of the light source is uneven or spotty, the same light receiving sensor always gave values different from the normal values and there was a detrimental effect on the measurement precision. Further, when the glass scale 10 was scratched or dirty, the location of differences in illuminance would move along with movement of the glass scale, the light receiving elements receiving this would give erroneous values, and there would therefore be a detrimental effect on the measurement precision.

DISCLOSURE OF INVENTION

Therefore, a first object of the present invention is to provide a contact type digital displacement meter which eliminates the fixed scale for detecting the difference in lightness of an overlapping moving scale and fixed scale, makes the contact type digital displacement meter thinner, and facilitates adjustment for positioning the surfaces of two scales with each other.

A second object of the present invention is to enable the effects of any unevenness or spottiness of the illuminance of the light source or any scratches or dirt on the glass scale to be suppressed and prevent a detrimental effect on the measurement precision of an optical displacement measurement apparatus.

A third object of the present invention is to increase the areas of the valid light receiving portions of the light receiving elements at the portion struck by the light from the light source so as to raise the light receiving efficiency and to enable the effects of any unevenness or spottiness of the illuminance of the light source or any scratches or dirt on the glass scale to be suppressed and prevent a detrimental effect on the measurement precision of an optical displacement measurement apparatus.

To achieve the first object, in the case of an optical displacement measurement apparatus having a displaceable first member having an optical grid, a light source for emitting light to the first member, and a light receiving element unit for receiving light passing through the first member, the present invention is characterized by setting a distance between the first member and light receiving element units to ½ of a Talbot distance and comprising the light receiving element unit by light receiving element groups. Further, in the case of a photoelectric transmission type linear encoder comprised of a light source comprised of an LED and condenser lens, a first member comprised of a moving scale, and a photodiode masked at the same pitch as the first member, the present invention is characterized by setting a distance between the first member and the photodiode to ½ of a Talbot distance.

Here, the "Talbot" phenomenon is the phenomenon that the same distribution of light intensity is reproduced as on the surface of a cyclical structure at a distance (Talbot distance) of a whole multiple of the distance given by $$Zt=(2\times D^2)/\lambda$$

where D is the grid pitch and λ is the wavelength, when emitting planar monochromatic light to a cyclical structure such as a diffraction grid and was discovered by H. F. Talbot in 1836.

According to this means, if the pitch of the moving scale is made 20 μm and the wavelength λ of the light emitting element is made 700 nm, the distance forming a Talbot image becomes $$(2\times D^2)/\lambda=Zt=1,142 \ \mu m$$

Therefore, it is sufficient to set a light receiving element, that is, a photodiode, at a position of Zt/2=571 μm. Compared with the past, the distance can be increased 10 to 500 fold, the ease of assembly can be improved, and an inexpensive contact-type digital displacement meter can be provided.

To achieve the second object, an optical displacement measurement apparatus of the present invention is an optical displacement measurement apparatus having a displaceable first member having an optical grid, a light source for emitting light to the first member, and a light receiving element unit for receiving light passing through the first member, characterized in that the light receiving element unit is comprised of light receiving element groups which are arranged shifted in increments of a predetermined distance with respect to a direction of displacement of the first member.

In this case, it is possible to configure the light receiving element groups by providing a plurality of light receiving element arrays provided at a predetermined pitch of the valid light receiving portions and the invalid light receiving portions. Further, it is possible to arrange the plurality of light receiving element arrays shifted by increments of a predetermined distance in the direction of displacement of the first member. The optical grid may be comprised of transparent portions and nontransparent portions provided at a pitch S of a ratio of the width of the transparent portions and the width of the nontransparent portions of 1:1. Further, the light receiving elements comprising the light receiving element arrays may be provided at a pitch S of a width of the valid light receiving portions and a width of the invalid light receiving portions of 1:1.

According to this configuration, since there are a plurality of light receiving elements having specific positional information and there are a plurality of dispersed light receiving element arrays comprised of a plurality of light receiving elements having this specific positional information, even when the illuminance of the light source is uneven or spotty or when the glass scale is scratched or dirty, all of the light receiving elements suffer that effect a bit each and average it out and therefore it is possible to prevent any detrimental effect on the measurement precision.

To achieve the third object, the optical displacement measurement apparatus of the present invention has a displaceable first member having an optical grid, a light source for emitting light to the first member, and light receiving element arrays for receiving light passing through the first member and having a plurality of light receiving elements at the valid light receiving portions and invalid light receiving portions, characterized in that the pitch of the optical grid is larger than the pitch of the light receiving elements and the light receiving element arrays are arranged in the direction of displacement of the first member.

In this case, it is possible to make the ratio of the width of the transparent portions and the width of the nontransparent portions of the optical grid of the first member 1:1 and make the width of the valid light receiving portions and width of the invalid light receiving portions of the light receiving elements such that the width of the valid light receiving portions is larger than the width of the invalid light receiving portions.

In addition, it is possible to make the width of the invalid light receiving portions 2 to 3 $\mu$m.

Further, it is possible to provide light receiving element groups having pluralities of light receiving element arrays.

According to this configuration, since the width of the valid light receiving portions and width of the invalid light receiving portions of the light receiving elements are such that the width of the valid light receiving portions is larger than the width of the invalid light receiving portions, it is possible to increase the areas of the valid light receiving portions of the light receiving elements at the portion struck by light and possible to give resistance to noise and prevent a detrimental effect on the measurement precision.

Further, since a plurality of light receiving elements having specific positional information are arranged dispersed or a plurality of arrays comprised of a plurality of dispersed light receiving elements having specific positional information are arranged dispersed, even when the illuminance of the light source is uneven or spotty or when the glass scale is scratched or dirty, all of the light receiving elements of the positional information suffer that effect a bit and average it out and therefore it is possible to prevent any detrimental effect on the measurement precision.

BRIEF DESCRIPTION OF DRAWINGS

The above and other objects, features, advantages, etc. of the present invention will be explained in detail below according to embodiments shown in the attached drawings, in which:

FIG. 28 is a view of an optical grid and light receiving element groups according to a 10th embodiment.

BEST MODE FOR CARRYING OUT THE INVENTION

Figure 8:
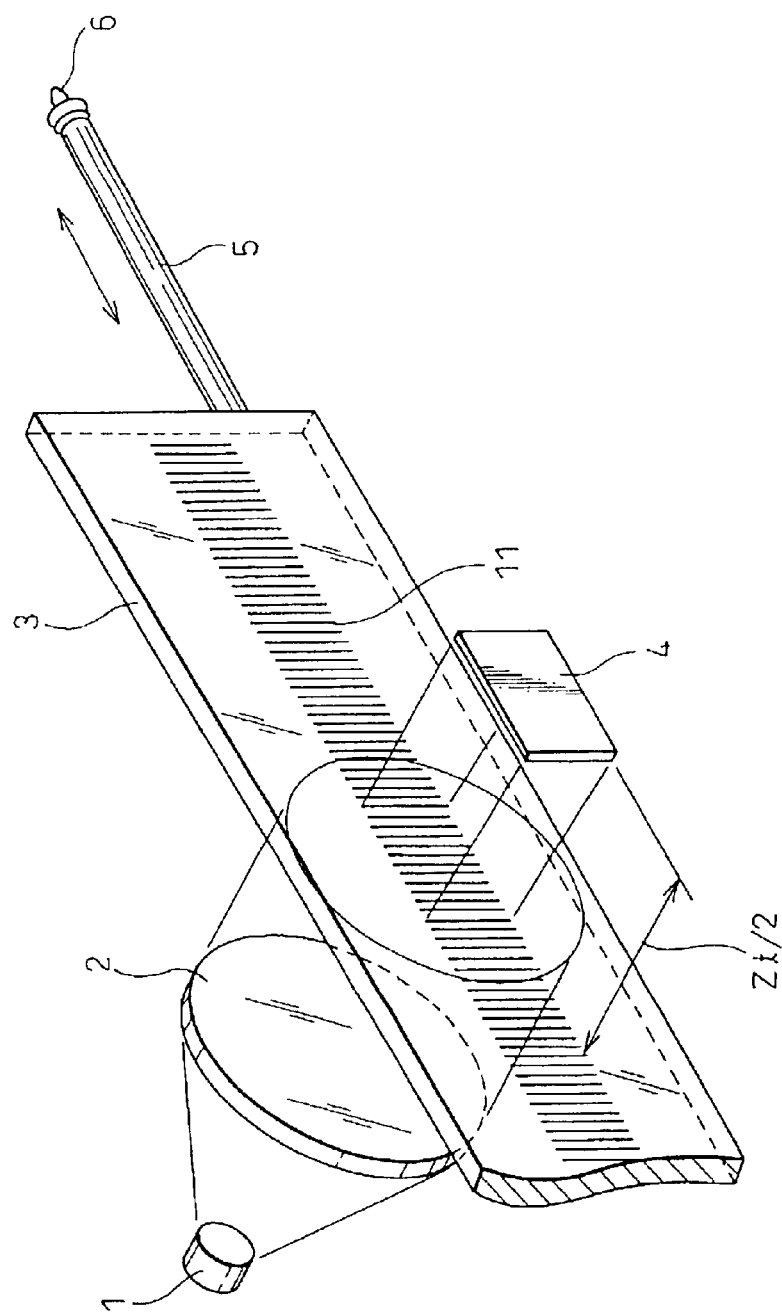
FIG. 8 is a view explaining the principle of the optical displacement measurement apparatus of the present invention.

FIG. 8 is a view explaining the principle of the optical displacement measurement apparatus of the present invention. In the figure, 1 is a light source, 2 a condenser lens, 3 a moving scale, 4 a masked light receiving element, that is, a photodiode, 5 a spindle, 6 a contactor, and 11 an optical grid marked on the moving scale 3. In this figure, an LED is used for the light source 1, while the optical grid 11 is comprised of bars having a predetermined line width and predetermined length and blocking light and marked on the moving scale 3 at a predetermined pitch. The LED 1 and the photodiode 4 are arranged facing each other across the moving scale 3 which moves in accordance with displacement. The moving scale 3 is provided with a spindle 5 projecting from it. At the front end of the spindle 5 is screwed a contactor 6 for contacting the measured object.

The light receiving surface of the photodiode is given two maskings. The pitches and line widths of the maskings are similar to those of the optical grid 11 of the moving scale 3, but the two maskings are shifted from each other by ¼ pitch. The distance between the moving scale 3 and the photodiode 4 is set to the value Zt/2 of half of the Talbot distance Zt.

When planar monochromatic light strikes the moving scale 3, the Talbot distance Zt is given by $Zt=(2\times D^2)/\lambda$ where D is the scale pitch and λ is the wavelength. The same distribution of light intensity as the moving scale 3 is reproduced at that position. Further, the distribution of light intensity of the moving scale 3 shifted by ½ cycle is reproduced at the position of half of that distance.

In actuality, the LED 1 does not emit completely planar monochromatic light, so the distribution of light intensity of the moving scale 3 can be reproduced and a clear image obtained at a short distance of zt/2 of half of the Talbot distance Zt.

When bringing the contactor 6 into contact with the measured object and measuring the movement of the measured object, the spindle 5 moves in the direction shown by the arrow along with displacement of the measured object. In this case, when the bright portions of the Talbot image of the moving scale 3 formed on the light receiving surface of the masked photodiode 4 match with the not masked portions of the light receiving surface, the amount of light received by the photodiode 4 becomes maximum. When the Talbot image moves by exactly ½ of the pitch from this position, the amount of light received becomes minimum. Further, the photodiode 4 has two light receiving parts shifted by ¼ pitch, so the two signals output from the masked photodiode 4 become sinusoidal signals shifted by ¼ pitch. By counting the number of cycles of the signals, the distance of movement of the moving scale and, from the phase difference of the signals, the left or right direction of movement, can be found.

Next, embodiments of the present invention will be explained using the drawings. The contact type digital displacement meter 40 incorporating the photoelectric transmission type linear encoder of the present invention is also used, as explained in FIG. 1, connected to a counter 41 by a connection cable 7. The value measured by the contact type digital displacement meter 40 is displayed on a display unit 42 of the counter 41.

Figure 1:
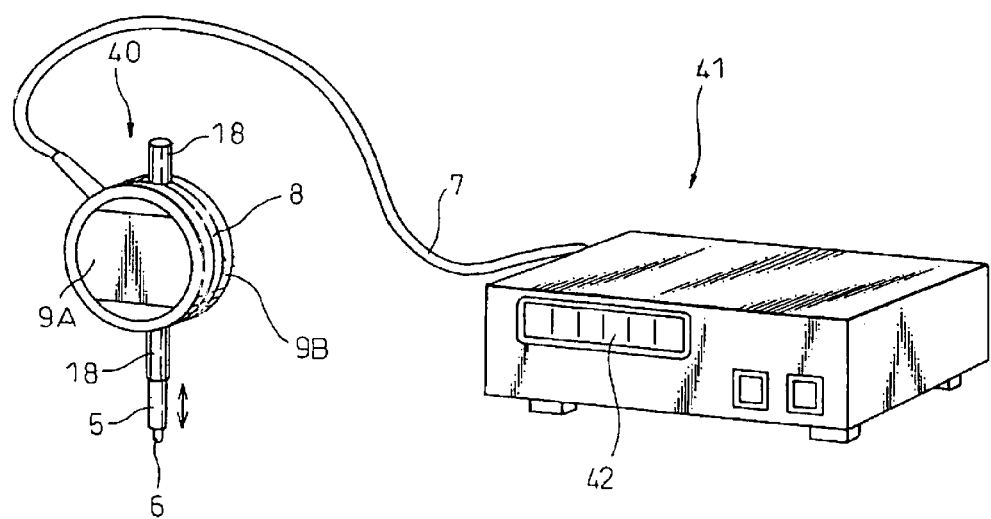
FIG. 1 is a view of the overall configuration showing the state of use of a contact type digital displacement meter to which the present invention is applied.
Figure 9:
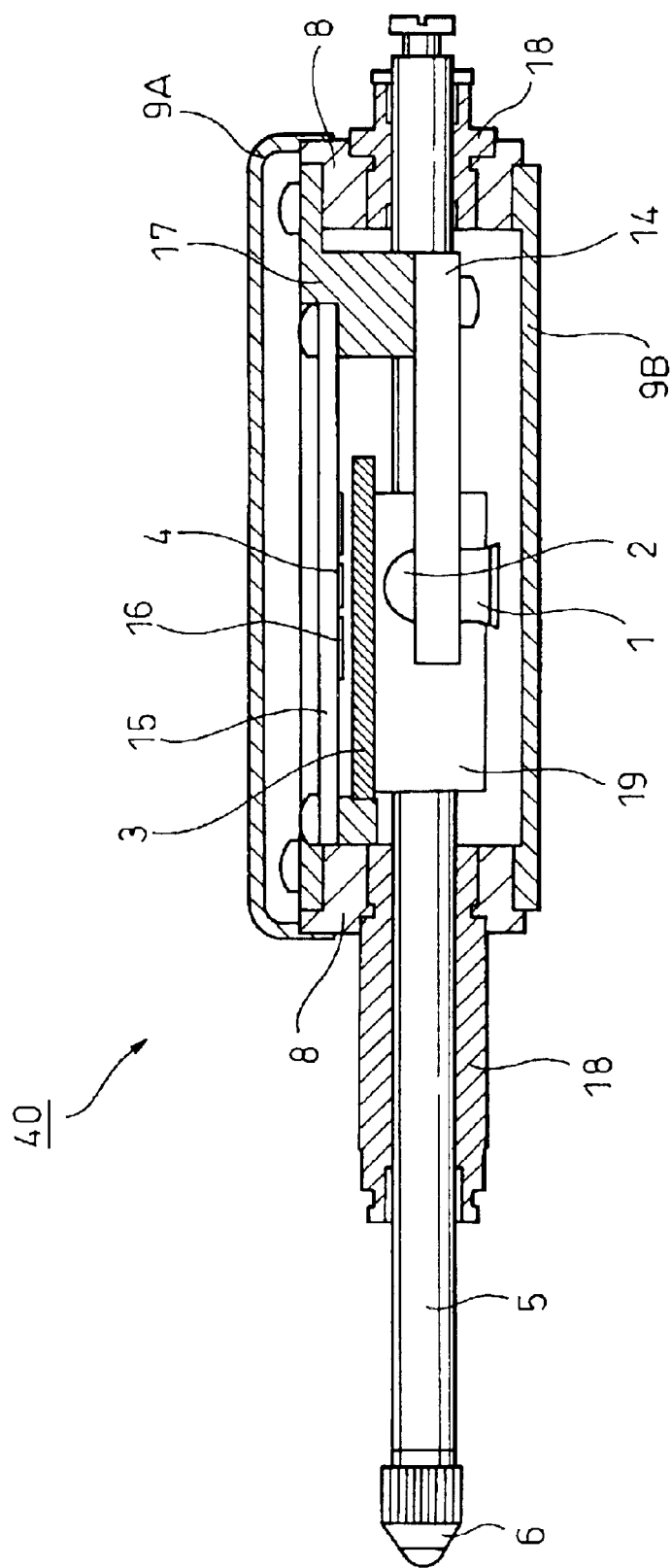
FIG. 9 is a sectional view of a contact type digital displacement meter of the first embodiment of the present invention.

FIG. 9 shows a first embodiment of the present invention and shows a cross-section of the contact type digital displacement meter 40 incorporating the photoelectric transmission type linear encoder explained in FIG. 1. The frame 8 has an upper cover 9A, lower cover 9B, and linear encoder support base 17 screwed to it. A spindle 5 is supported by two bearings 18 fastened to the frame 8. A contactor 6 screwed into the front end of the spindle 5 contacts the measured object. The moving scale 3 is positioned with and fastened to a moving scale support base 19, while the moving scale support base 19 is positioned with and fastened to the spindle 5, so movement of the spindle 5 becomes the same as movement of the moving scale 3. The moving scale 3 is sandwiched between an LED 1 provided with a condenser lens at the light emitting side and a masked photodiode 4 at the light receiving side.

For the stopping mechanism of the spindle 5, while not shown, one end of a stopping rod is fastened to the spindle 5. The other end slides in a groove provided in the frame 8 to thereby function as a stopping member. Further, the rod is linked with the frame 8 by a tension spring and is set to apply a suitable contact pressure to the measured object.

At the light emitting side, the LED 1 to which the condenser lens 2 is fastened is fastened to the LED support base 14 screwed to the frame 8 and faces the masked photodiode 4 at the light receiving side across the moving scale 3. The LED support base 14 is positioned by being screwed into the linear encoder support base 17 so as to facilitate positioning with the light receiving side. The masked photodiode 4 at the light receiving side is positioned with and fastened to the PCB 15 and is supported by a photodiode protective member 16 of substantially the same height as the photodiode 4.

Figure 2:
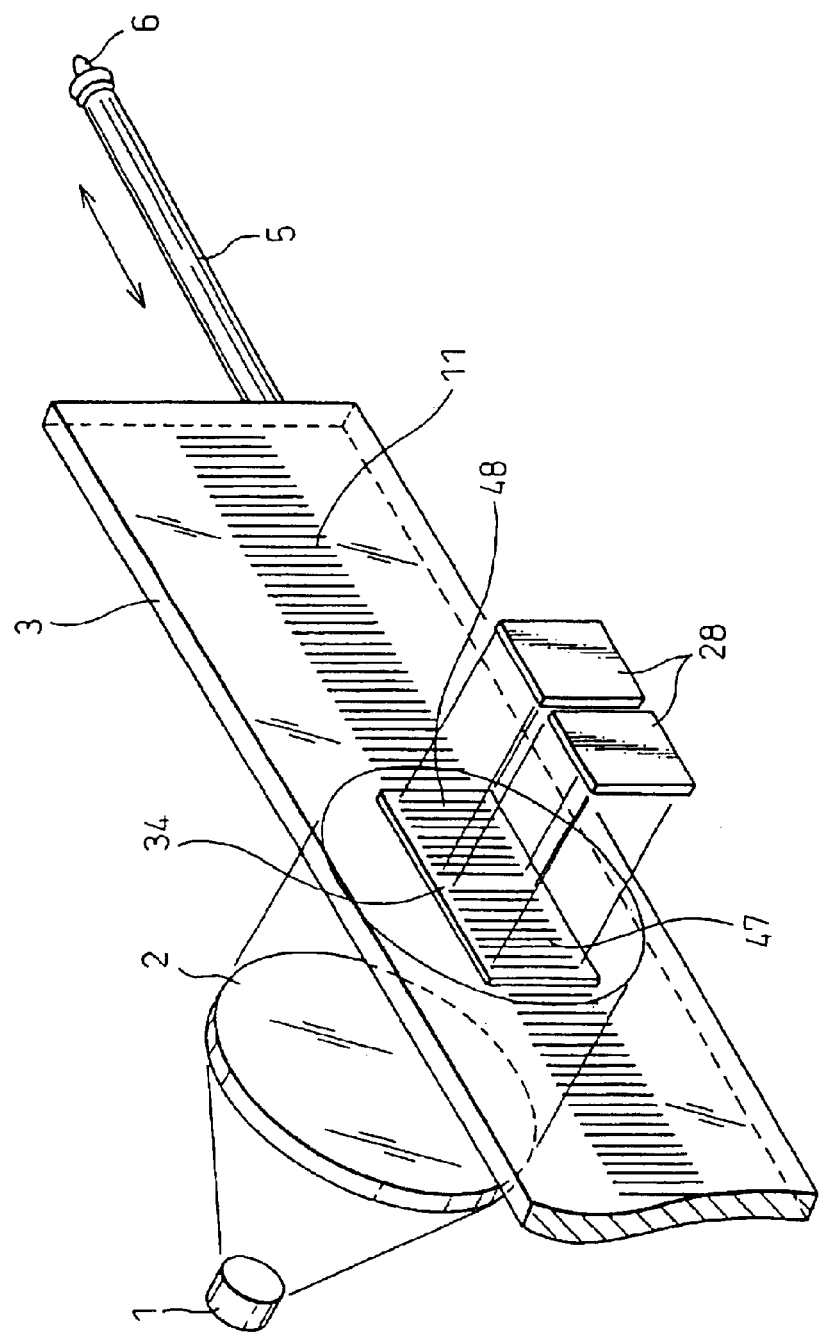
FIG. 2 shows a first prior art and explains the principle of a photoelectric transmission type linear encoder of a contact type digital displacement meter.
Figure 10:
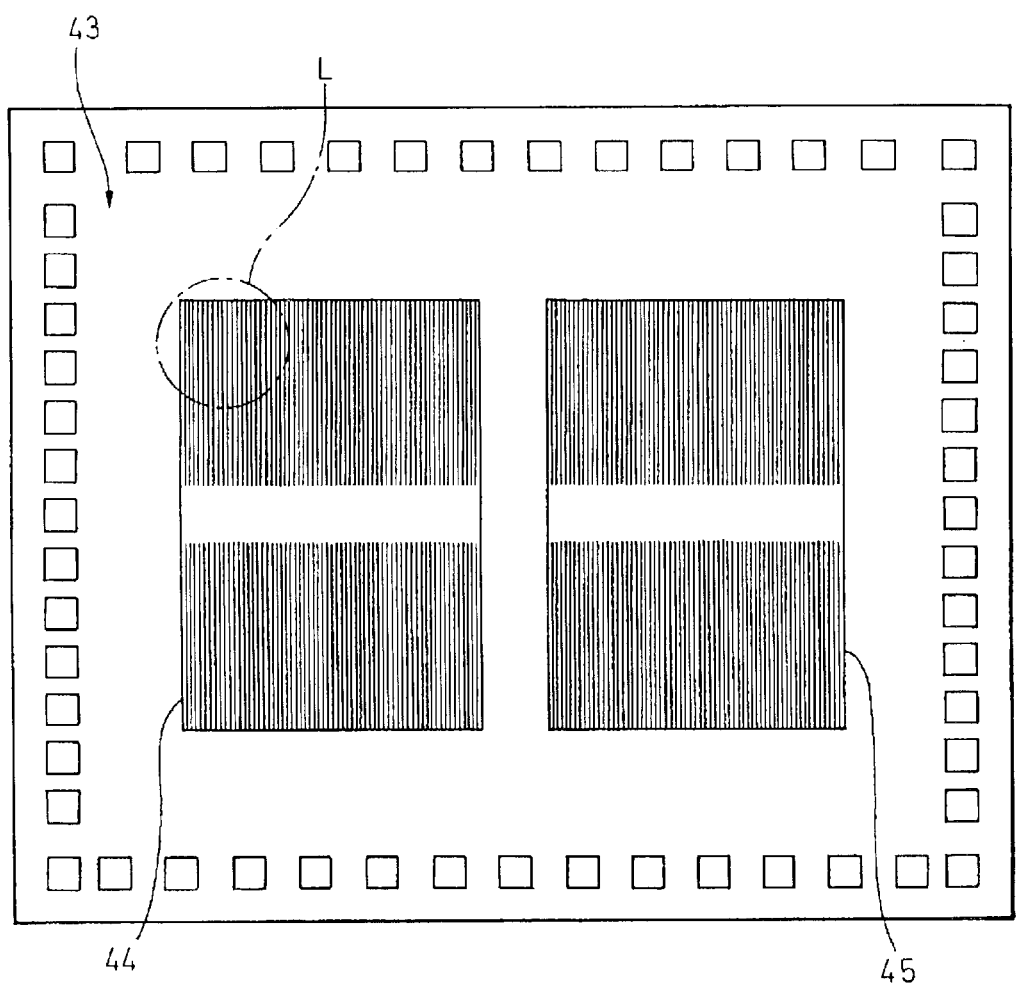
FIG. 10 is an enlarged view of the light receiving surface of a masked photodiode of FIG. 9.

FIG. 10 shows an embodiment of a mask directly printed on the photodiode 4 by photolithography. The light receiving surface 43 of the masked photodiode 4 is divided into a first masking part 44 and a second masking part 45. The first masking part 44 and the second masking part 45 are masked by lines of the same pitch and same line width as the optical grid 11 of the moving scale 3. Further, the first masking part 44 and second masking part 45 are arranged shifted by ¼ pitch in the same way as the fixed scale 34 of the prior art (FIG. 2) and discriminate whether the moving scale 3 has moved to the left or right.

Figure 11:
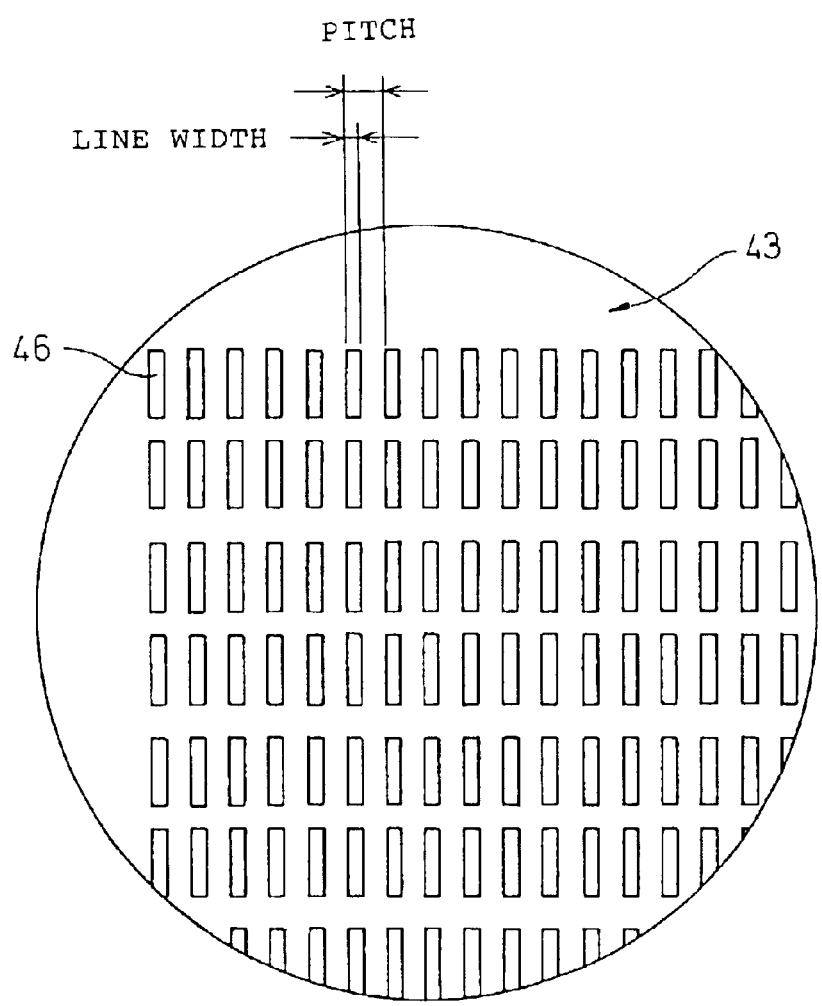
FIG. 11 is a further enlarged view of part of the light receiving surface of FIG. 10.

FIG. 11 is a further enlargement of the L part of FIG. 10. The light receiving part 43 of the photodiode matches with the pitch of the optical grid 11 of the moving scale 3 and has a line width set substantially equal as well. In the present embodiment, when the pitch of the moving scale is 20 μm and the line width is 10 μm, one pixel 46 of the light receiving part has a pitch of 20 μm and a line width of 8 μm. The length is 36 μm.

Here, returning to FIG. 9, the operation of the contact type digital displacement meter 40 will be explained. The light emitted from the LED 1 passes through the condenser lens 2 and the moving scale 3 and forms a Talbot image at a predetermined position from the moving scale 3 based on the wavelength of the LED 1 and the pitch of the moving scale 3. That is, if the pitch of the moving scale is 20 μm and the wavelength of the LED 1 is 700 nm, it is formed at a position of $zt/2=2\times 20^2/0.7/2=571$ μm from the moving scale 3. Therefore, by setting the masked photodiode 4 at this position, the Talbot image of the moving scale 3 is formed at the light receiving part 43 of the photodiode 4.

When the bright portions of the Talbot image of the moving scale 3 and the light receiving pixels 46 at the light receiving unit 43 of the photodiode 4 match, the sinusoidal signal output from the photodiode 4 becomes maximum, while when the dark portions and the light receiving pixels 46 match, the sinusoidal signal output becomes the minimum.

Figure 3:
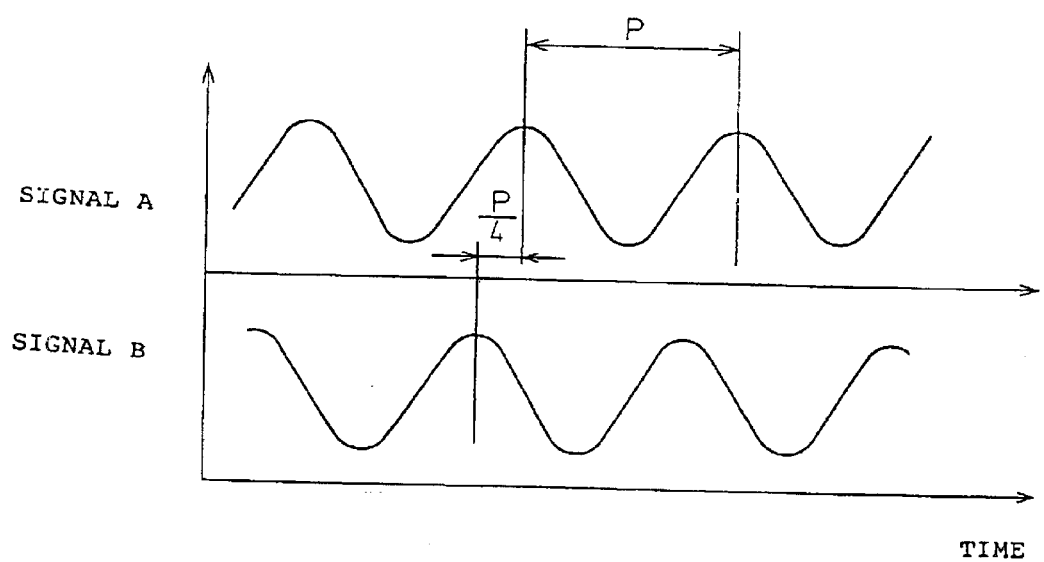
FIG. 3 is a waveform diagram of waveforms of the signals output from the photodiodes of FIG. 2.
Figure 4:
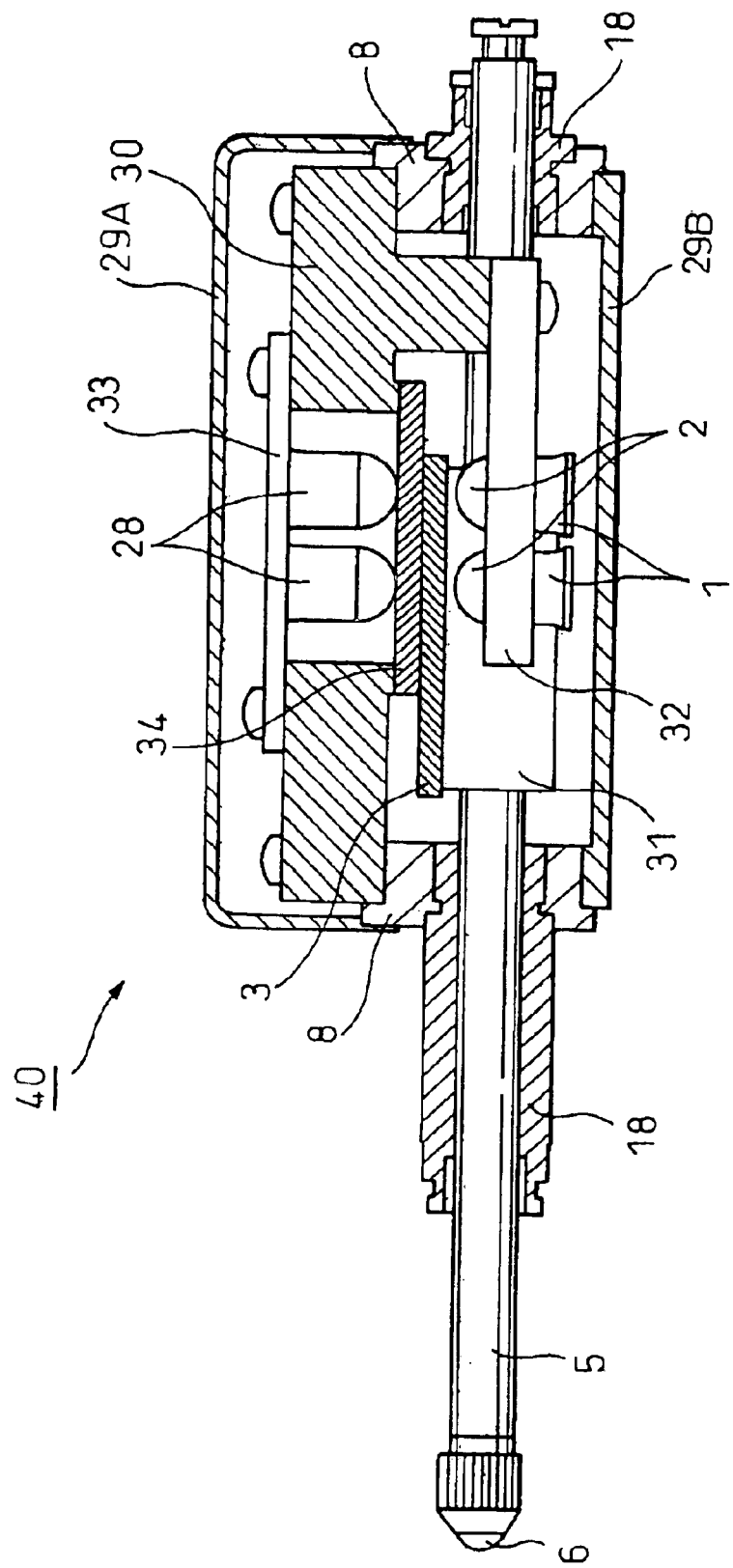
FIG. 4 is a sectional view of the configuration of an example of a conventional photoelectric transmission type linear encoder.
Figure 5:
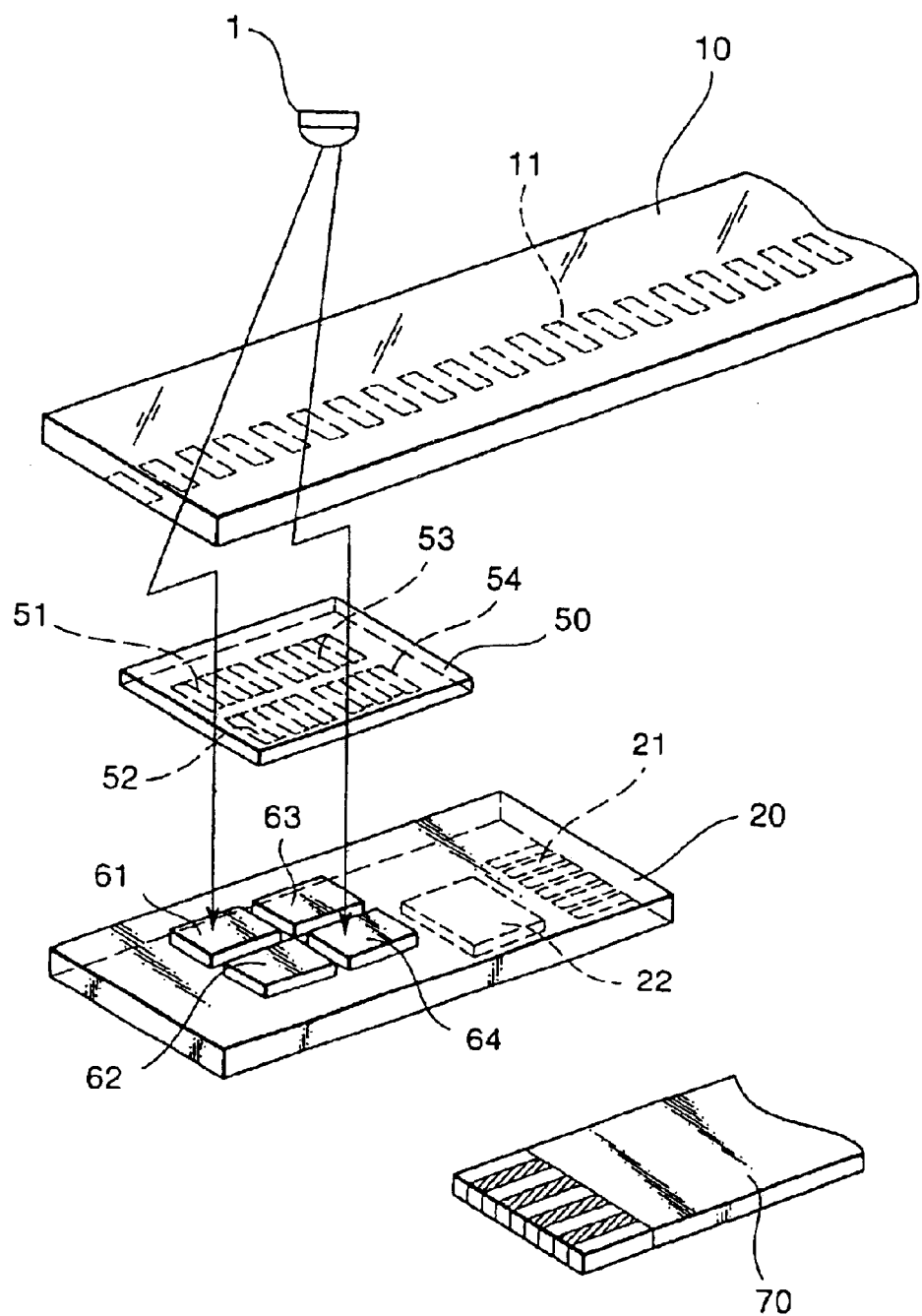
FIG. 5 is a view of the configuration of a photoelectric transmission type linear encoder of a second prior art.
Figure 6:
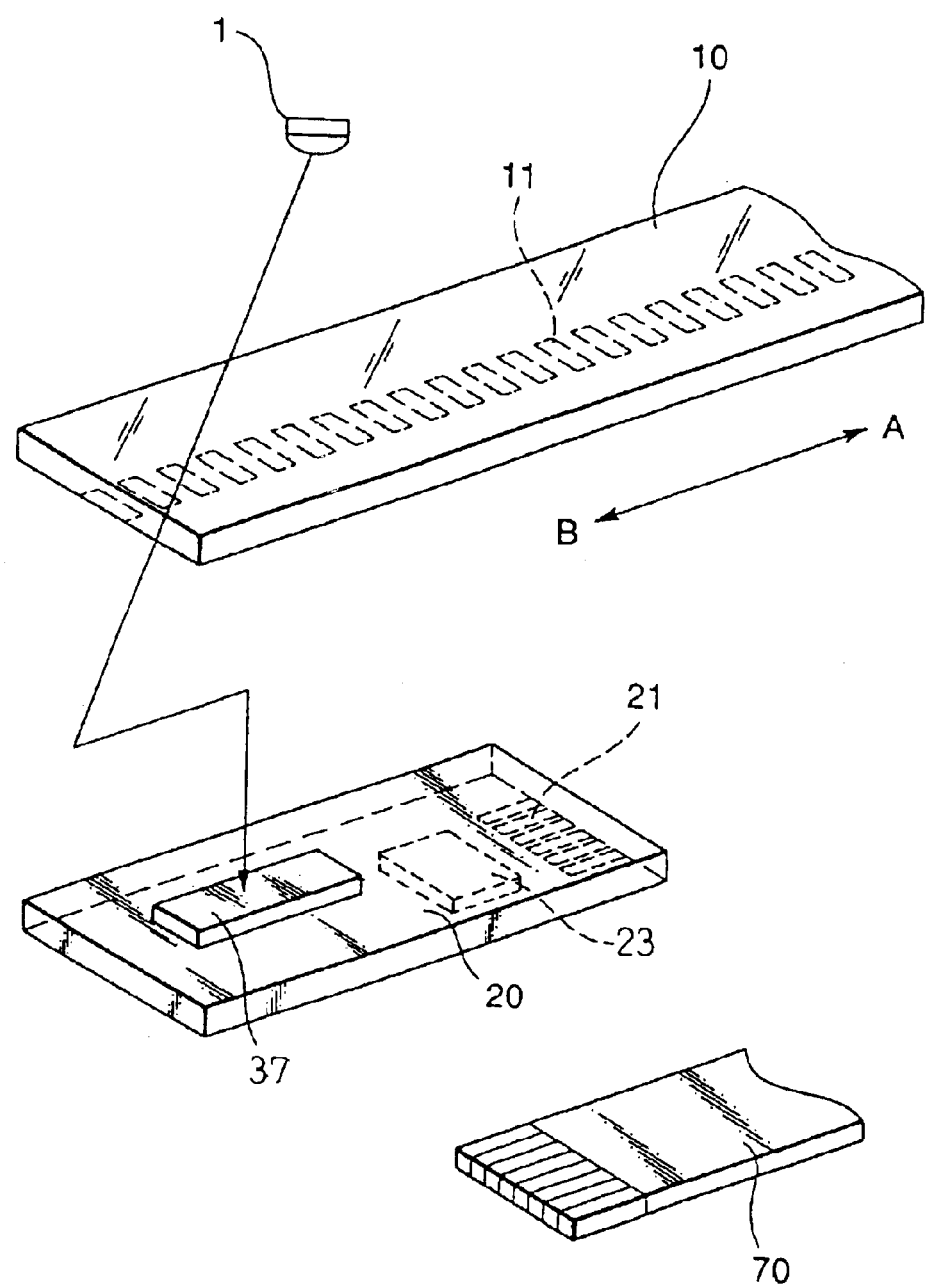
FIG. 6 is a view of the configuration of a photoelectric transmission type linear encoder of a third prior art.
Figure 7:
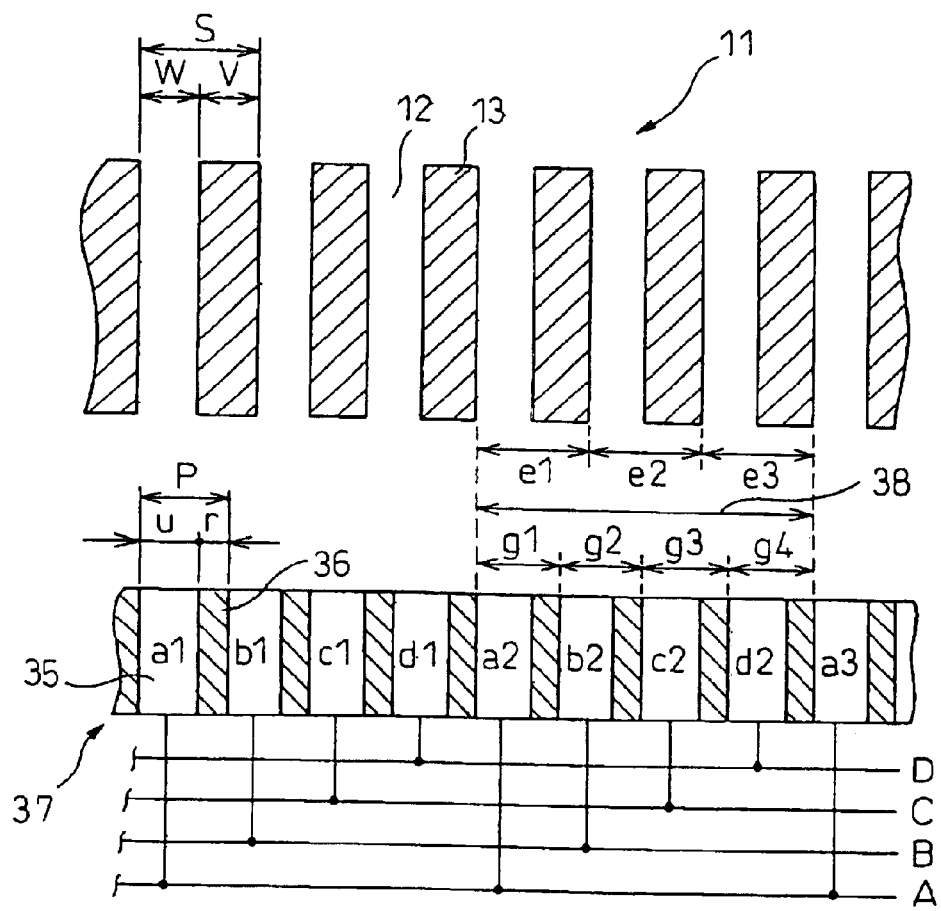
FIG. 7 is a view of the relationship between an optical grid and light receiving element array in the third prior art.

As explained in FIG. 10, the light receiving part 43 has a first masking part 44 and a second masking part 45 shifted by ¼ pitch, so, as explained in FIG. 3, the signal A is obtained from the first masking part 44 and the signal B from the second masking part 45 and it is possible to determine the left or right direction of movement of the moving scale 3.

As explained above, according to the present invention, the distance between the masked photodiode 4 and the moving scale 3 can be set to 570 μm by making it the Talbot distance zt/2. Since the distance can be enlarged 10 to 500 times from that of the past, the assembly and adjustment of distance become extremely easy, the fixed scale is unnecessary, and the cost can be reduced.

As clear from the above explanation as well, the masked photodiode 4 may also be an aggregate of pixels of CCDs. If the pitch is the same as the moving scale, it is sufficient to set two CCDs shifted by ¼ pitch.

Figure 12:
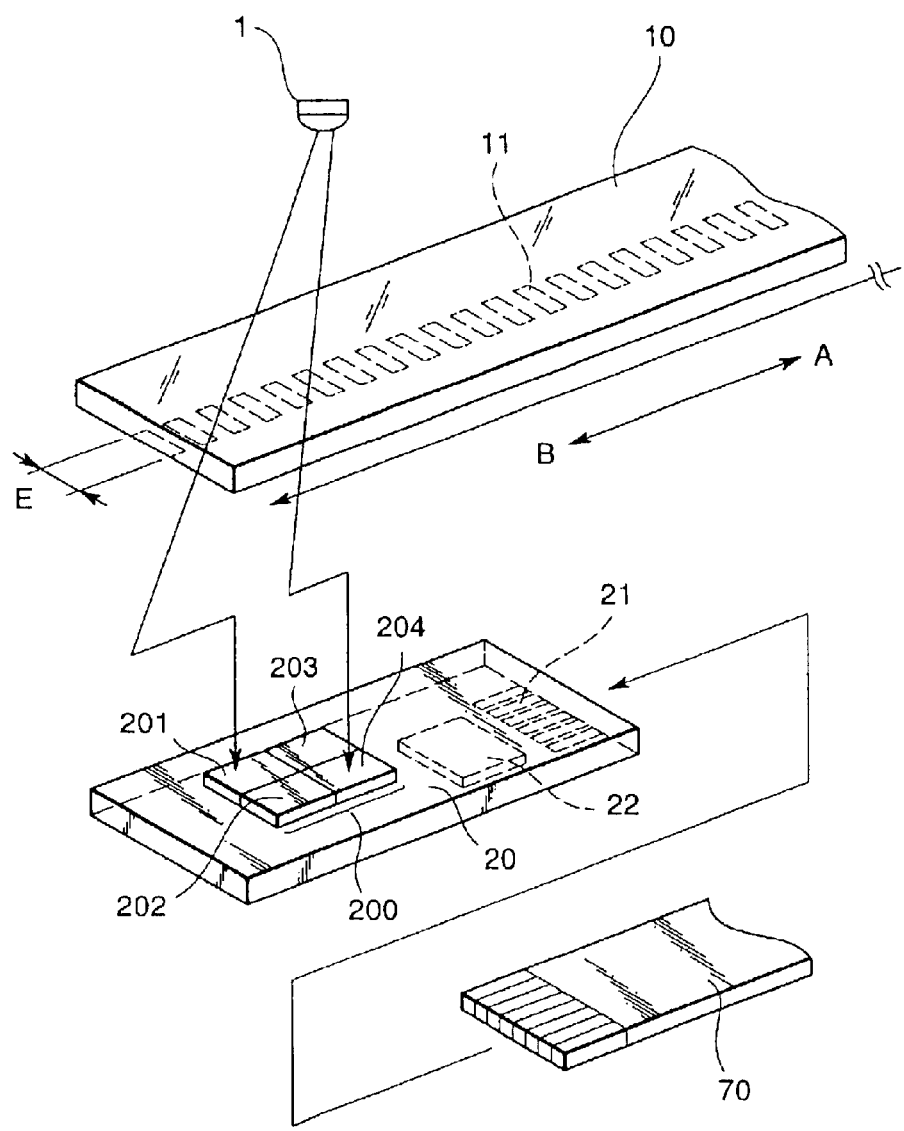
FIG. 12 is a schematic view of the configuration of an optical displacement measurement apparatus to which second to fourth embodiments of the present invention are applied.

FIG. 12 shows the configuration of a photoelectric transmission type linear encoder to which the second to fourth embodiments of the present invention are applied and shows one embodiment of the internal configuration of the contact type digital displacement meter 40 explained in FIG. 1. Reference numeral 10 is a glass scale serving as the moving scale. A light blocking optical grid 11 of a length E is provided on it. The glass scale 10 is connected to a spindle 5 shown in FIG. 1 and moves in the A-B direction by displacement of the measured object. Reference numeral 1 is a light source for emitting parallel light to the glass scale 10.

Reference numeral 200 is an aggregate of light receiving element groups for receiving light passing through the glass scale 10 provided on a board 20 and corresponds to the photosensor 4 explained in FIG. 8. The aggregate 200 of light receiving element groups is comprised of light receiving element groups 201 to 204. Reference numeral 22 is a semiconductor integrated circuit for position processing (IC chip), while 21 is a terminal for connecting with a cable 70. The cable 70 supplies power to the circuits on the board 20. Further, the signals from the circuits on the board 20 are transmitted by the cable 70 to a display device or other external device.

Figure 13:
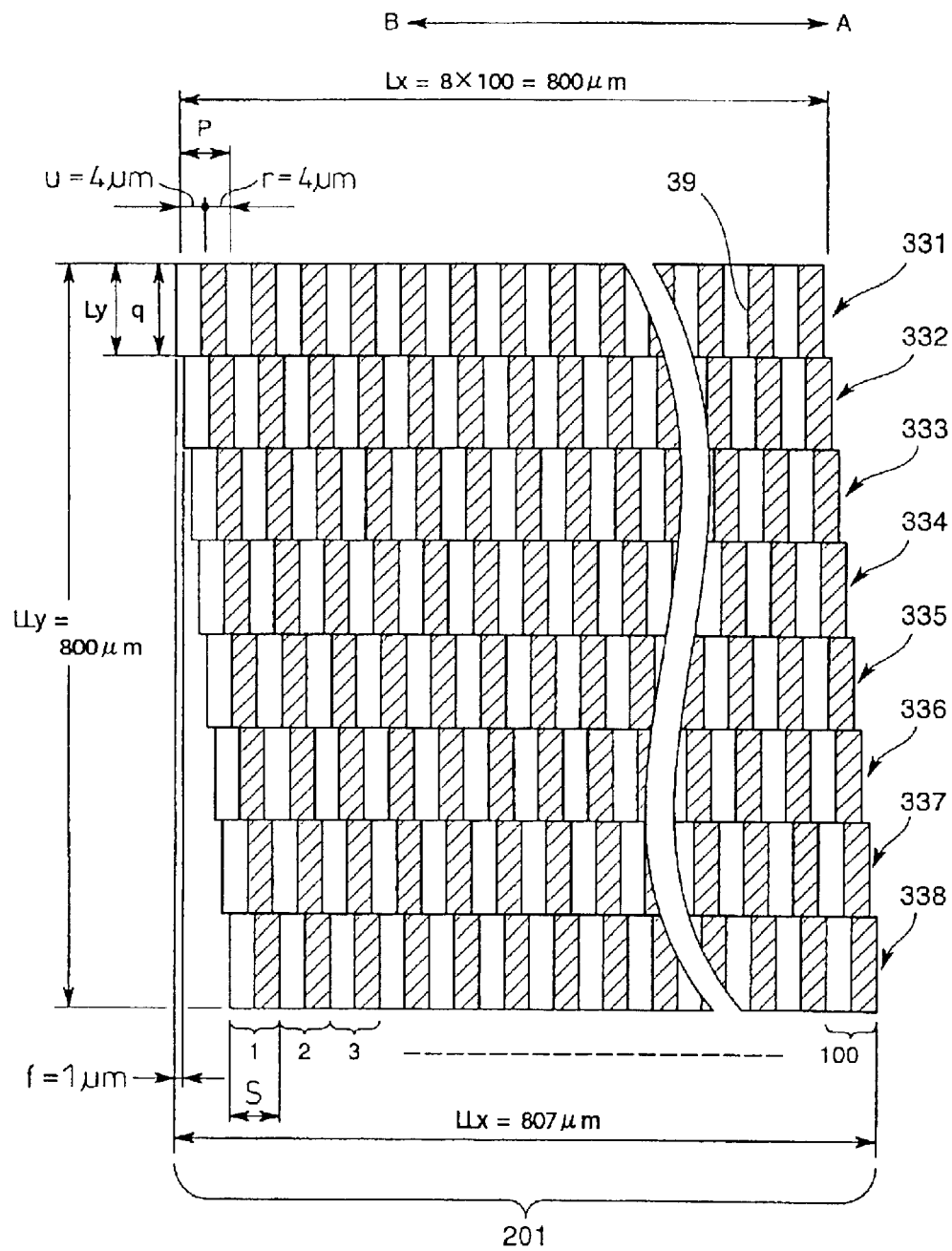
FIG. 13 shows the second embodiment of the present invention and is an enlarged view of a predetermined light receiving element group of FIG. 12.

FIG. 13 shows a second embodiment of the present invention. The figure enlarges one light receiving element group 201 in the aggregate 200 of light receiving element groups to show details of the same. The light receiving element group 201 is comprised of eight light receiving element arrays 331 to 338 arranged in parallel with the direction of movement A-B of the glass scale 10. The light receiving element arrays 331 to 338 are comprised of pluralities of light receiving elements 39.

Figure 14:
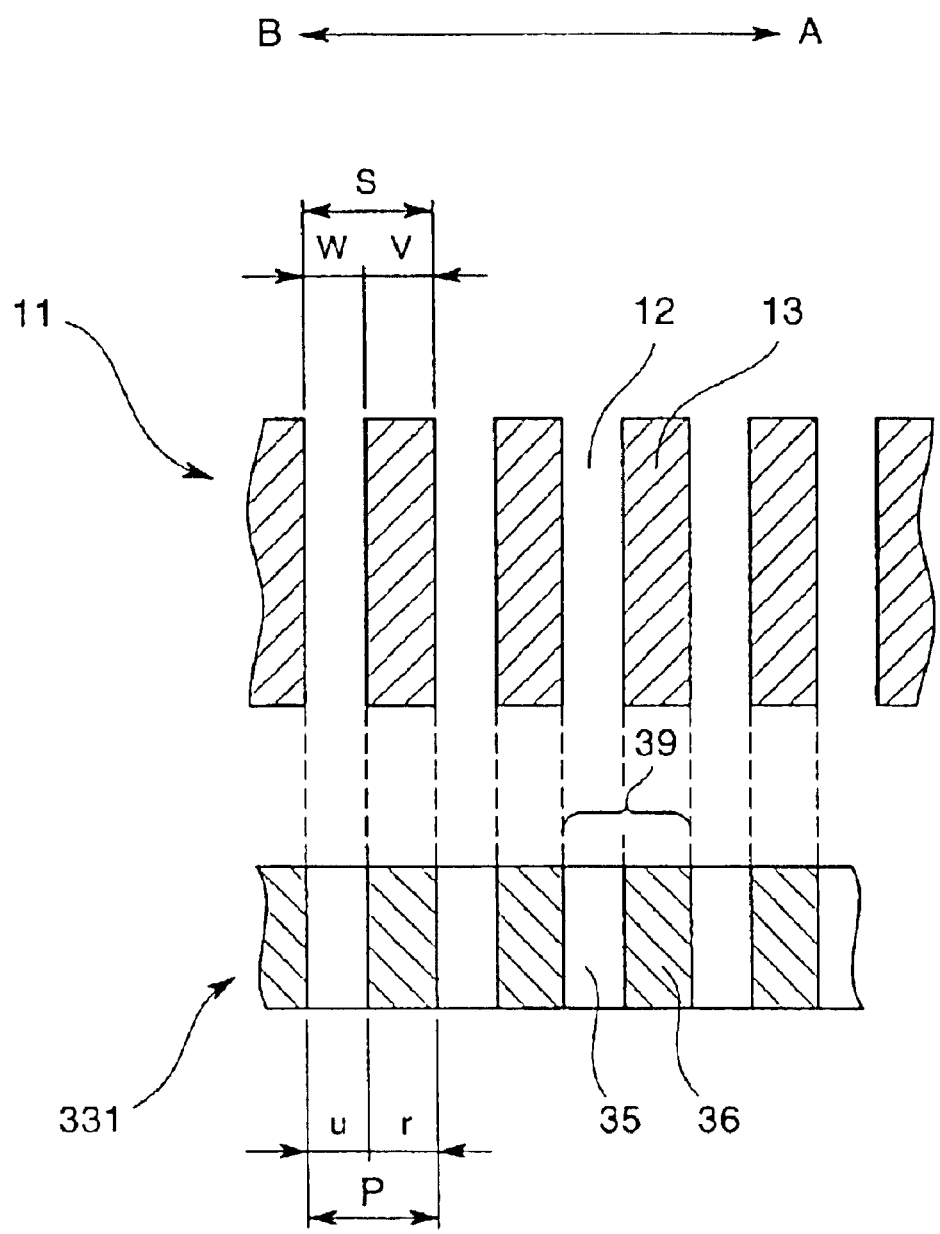
FIG. 14 is a view of the relationship between an optical grid and light receiving element array.

Here, the relationship between the light receiving elements 39 at the light receiving element arrays 331 to 338 and the optical grid 11 at the glass scale 10 will be explained using FIG. 14. FIG. 14 is an enlarged view of part of the optical grid 11 and light receiving element array 331 and shows the dimensional relationship among the parts. The arrow A-B shows the direction of movement of the glass scale 10. $\underline{S}$ shows the pitch of the optical grid 11, $\underline{W}$ shows the width of a transparent portion 12 of the optical grid 11, and $\underline{V}$ shows the width of a nontransparent portion 13 of the optical grid 11. Here, the width $\underline{w}$ of the transparent portion 12 and the width $\underline{V}$ of the nontransparent portion 13 are set to ½ of the pitch $\underline{S}$ of the optical grid 11. For example, if the pitch $\underline{S}$ of the optical grid 11 of the glass scale 10 is set to 8 μm, the width W of the transparent portion 12 of the optical grid 11 is 4 μm and the width $\underline{V}$ of the nontransparent portion 13 of the optical grid 11 is 4 μm.

On the other hand, each of the plurality of light receiving elements 39 comprising the light receiving element array 331 is comprised of a valid light receiving portion 35 able to receive light and an invalid light receiving portion 36 not able to receive light. $\underline{P}$ shows the width of a light receiving element 39, $\underline{u}$ the width of the valid light receiving portion 35, and $\underline{r}$ the width of the invalid light receiving portion. Here, the width $\underline{P}$ is equal to the pitch $\underline{S}$ of the optical grid 11, while the width $\underline{u}$ of the valid light receiving portion 35 and the width $\underline{r}$ of the invalid light receiving portion are set to ½ of the pitch $\underline{S}$ of the optical grid 11.

As will be understood from FIG. 13, the light receiving element arrays 331 to 338 are all comprised of the same dimensions. Each of the light receiving element arrays 331 to 338 is comprised of 100 light receiving elements 39 arranged in the lateral direction (direction parallel to A-B) and one light receiving element 39 in the longitudinal direction (direction perpendicular to A-B).

The pitch $\underline{P}$ of each light receiving element 39 is set to 8 μm in the same way as the pitch $\underline{S}$ of the optical grid 11. Further, the valid light receiving portions $\underline{u}$ and invalid light receiving portions $\underline{r}$ are set to 4 μm each in the same way as the transparent portions 12 and nontransparent portions 13 of the optical grid 11. Therefore, the length Lx of each light receiving element array in the lateral direction becomes 800 μm (8 μm×100). Further, the length g of each light receiving element 39 in the longitudinal direction is set to 100 μm, so the total length LLy of eight light receiving element arrays 331 to 338 in the longitudinal direction is 800 μm.

Further, in the second embodiment, the adjoining light receiving element arrays are arranged shifted in the lateral direction from each other by exactly ⅛ of the pitch $\underline{S}$ of the optical grid 11, that is, the distance $\underline{f}$=S/8=1 μm. Therefore, the total length LLx of the light receiving element array group 201 in the lateral direction becomes the length Lx of one light receiving element array in the lateral direction plus seven times the shift distance $\underline{f}$, that is, a length of 807 μm. Note that here, the light receiving element arrays are arranged shifted by 1 μm increments in the A direction with respect to the light receiving element array 331 at the top in the figure, but if necessary the amount of shift $\underline{f}$ may also be made f=S×n (n is an integer)+S/8. Further, the light receiving element arrays 331 to 338, as shown in FIG. 13, were arranged in contact with each other without clearance, but it is also possible to arrange the light receiving element arrays 331 to 338 while providing a space between the adjoining arrays.

Figure 15:
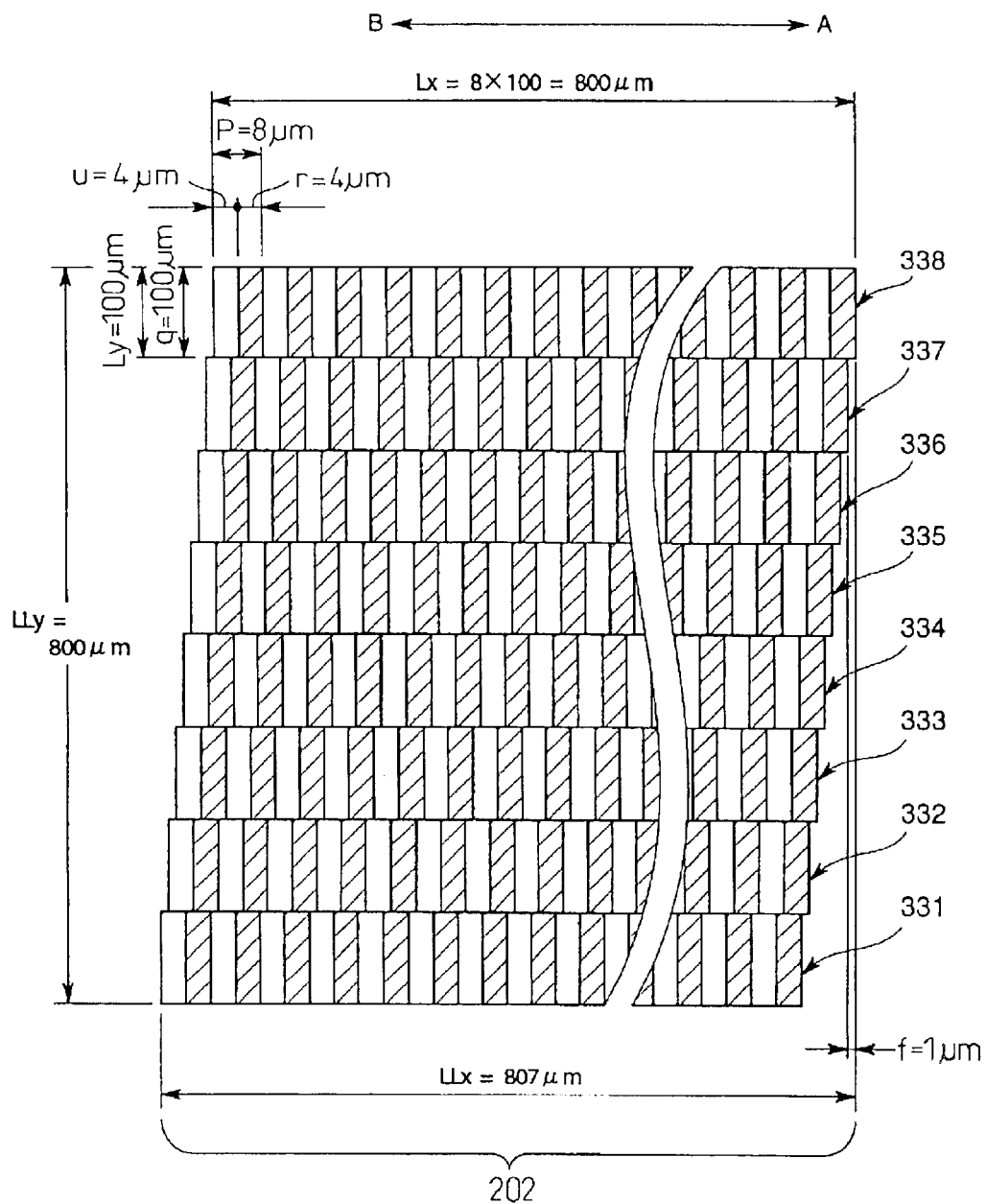
FIG. 15 shows the second embodiment of the present invention and is an enlarged view of another light receiving element group of FIG. 12.

FIG. 15 is a view of details of another light receiving element group 202 in the aggregate 200 of light receiving element groups. The light receiving element group 202 is comprised of seven adjoining light receiving element arrays 337 to 331 arranged parallel to the direction of movement A-B of the glass scale 10 shifted by 1 μm increments in the B direction with respect to the light receiving element array 338 at the top of the figure. The light receiving element group 202 differs from the light receiving element group 201 in only the point that the direction of shift of the adjoining light receiving element arrays with respect to the light receiving element array at the top of the figure is opposite. The size of the light receiving elements 39 and the pitch and number of the light receiving element arrays are the same as those of the light receiving element group 201.

Therefore, if the total length LLx of the light receiving element array group 202 in the lateral direction is 807 μm and the adjoining light receiving element arrays are shifted by 1 μm increments in the B direction of the direction of movement A-B of the glass scale 10 with respect to the light receiving element array 338 at the top of the figure, the position of the light receiving element array 331 at the bottom in the direction of movement of the glass scale 10 becomes the same as that of the light receiving element array 331 of the light receiving element array group 201. Thus, the numbers from the light receiving element arrays 331 to 338 in the light receiving element array group 202 of FIG. 15 are assigned corresponding to the light receiving element arrays emitting the same signals as the light receiving element arrays 331 to 338 of the light receiving element group 201 in FIG. 14 due to movement of the glass scale 10.

Figure 16:
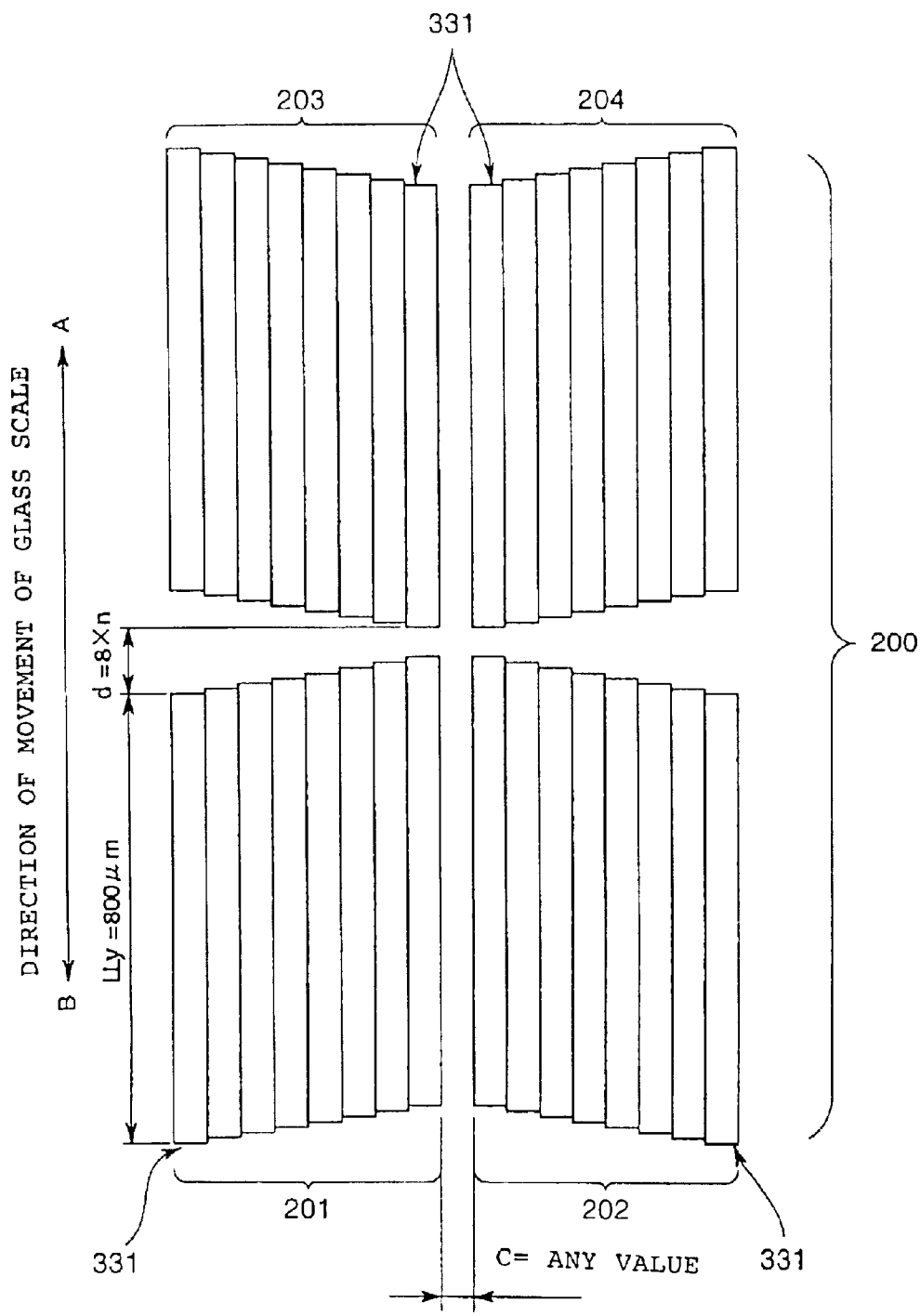
FIG. 16 is a view of the arrangement of light receiving element groups according to the second embodiment.

FIG. 16 shows the overall configuration of the aggregate 200 of light receiving element groups in the second embodiment. The light receiving element group 201 and the light receiving element group 202 were explained using FIG. 13 and FIG. 15, but the light receiving element group 203 is a light receiving element group the same as the light receiving element group 202, while the light receiving element group 204 is a light receiving element group the same as the light receiving element group 201. The distance C between the light receiving element group 201 and the light receiving element group 202 may be any distance. Further, in the light receiving element arrays emitting the same signals in the light receiving element groups 201 to 204, only the position of the light receiving element array 331 is shown.

The light receiving element arrays 331 of the light receiving element group 201 and the light receiving element group 202 are arranged in the same positional relationships relative to the transparent portions 12 and nontransparent portions 13 of the glass scale 10. The light receiving element arrays 331 of the light receiving element group 203 and light receiving element group 204 are also arranged in the same positional relationships relative to the transparent portions 12 and nontransparent portions 13 of the glass scale 10. Further, the light receiving element arrays 331 of the light receiving element group 201 and light receiving element group 203 are arranged at locations of whole multiples of the pitch S̲ of the glass scale 10 in positional relationship.

For this reason, these four light receiving element arrays 331 are all arranged at the same positional relationships relative to the transparent portions 12 and nontransparent portions 13 of the glass scale 10. Due to this, the same signal is generated from these four light receiving element array 331. This will be explained using FIG. 16.

The light receiving element arrays 331 of the light receiving element group 201 and the light receiving element group 202 have head positions starting from the same position. The light receiving element arrays 331 of the light receiving element group 203 and the light receiving element group 204 similarly have head positions starting from the same positions. Further, the positional relationship between the light receiving element arrays 331 is such that the total length LLy of the light receiving element array 331 of the light receiving element group 201 is 800 μm and the distance d̲ from the end of the light receiving element array 331 of the light receiving element group 201 to the head of the light receiving element array 331 of the light receiving element group 203 is a whole multiple of the pitch S̲ of the optical grid 11 (when whole number is n̲, S×n). That is, the head positions of all of the light receiving element arrays 331 are positions of whole multiples of the pitch =8 μm of the glass scale 10 and the same signal is produced from these four light receiving element arrays 331 due to movement of the glass scale 10.

For the remaining light receiving element arrays 331 to 338 as well, the same signals are generated from the light receiving element arrays of the same numbers due to movement of the glass scale 10 in view of the positional relationship with the light receiving element array 331. That is, it is understood that there are four dispersed light receiving element arrays from which the same signals are produced due to movement of the glass scale 10.

Due to this, in the second embodiment, it is understood that there are a plurality of light receiving elements having specific positional information and there are a plurality of dispersed light receiving element arrays comprised of pluralities of light receiving elements having such specific positional information. Therefore, when the illuminance of the light source is uneven or spotty or when the glass scale 10 is scratched or dirty, the effect is suffered a bit by all of the light receiving elements of the positional information and averaged out so it is possible to prevent any detrimental effect on the measurement precision.

Next, the flow of the signals output from the light receiving element groups 201 to 204 will be explained taking as an example the light receiving element arrays 331. Assume that the glass scale 10 and the light receiving element arrays 331 are in the positional relationship shown in FIG. 14. That is, assume that the transparent portions 12 of the glass scale 10 and the valid light receiving portions 35 of the light receiving elements 39 match and that the nontransparent portions 13 of the glass scale 10 and the invalid light receiving portions 36 of the light receiving elements 39 match. At this time, the signals obtained from the light receiving elements 39 become maximum. The signals from the four light receiving element arrays 31 obtained by adding all of these also become maximum.

When the glass scale 10 moves in the A direction, the nontransparent portions 13 of the glass scale 10 gradually cover the valid light receiving portions 35 of the light receiving elements 39. As a result, the outputs of the light receiving elements 39 gradually become smaller. When the optical grid 11 moves by exactly ¼ of the pitch S̲, the outputs of the light receiving elements 39 become ½ of the maximum output, while when it moves by exactly ½ of the pitch S̲, the valid light receiving portions 35 are completely covered by the nontransparent portions 13, so the outputs of the light receiving elements 39 become the minimum output. When the glass scale 10 moves further and moves by ¾ of the pitch S̲, the outputs of the light receiving elements 39 return to ½ of the maximum output. When moving by exactly one pitch S̲, the maximum outputs are again obtained from the light receiving elements 39.

The same is true for the other light receiving element arrays 332 to 338. On the other hand, the light receiving element arrays 332 to 338 are positioned shifted by 1 μm increments with respect to the light receiving element array 331, so the outputs of the light receiving elements 39 become maximum 1 μm delayed with respect to the light receiving element array 331. This relationship is shown by the waveforms I31 to I38 in FIG. 17. In the figure, I31 is the output signal of the light receiving element array 331, while I32 to I38 correspond to the light receiving element arrays 332 to 338.

If converting the signals I31 to I38 to digital values using a comparator having a threshold value of (maximum output−minimum output)/2, the results are the digital signals J31 to J38. Here, the digital signal SJ31 is the signal I31 converted to a digital value and inverts at (maximum output−minimum output)/2. The digital signals J32 to J38 correspond to the signals I32 to I38.

Figure 17:
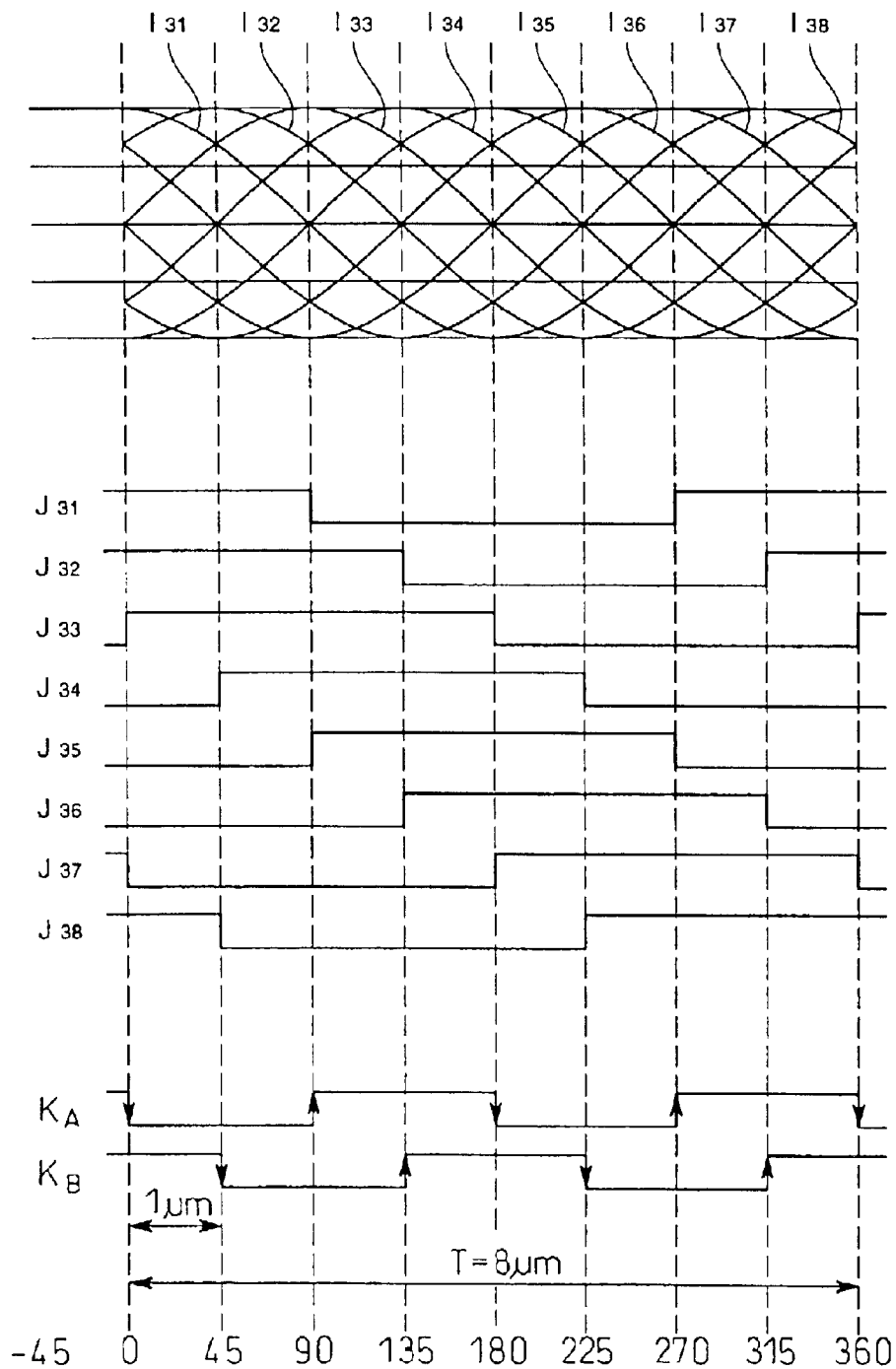
FIG. 17 is a view of changes of signals obtained from light receiving elements of the second embodiment and a 10th embodiment.

Further, the digital signals J31 to J38 are converted to two signals KA and KB comprised of $$KA = J31 \cdot J37 + J33 \cdot J35$$

$$KB = J32 \cdot J38 + J34 \cdot J36$$

by a logical operation circuit. The timings of the signals KA and KB are shown in FIG. 17 as well. As will be understood from FIG. 17, one cycle of the signal I31 is equal to the pitch S̲ (=8 μm) of the optical grid 11 of the glass scale 10, so the distance from the rising edge or the trailing edge of the signal KA to the trailing edge or rising edge of the signal KB becomes exactly 1 μm.

Therefore, if counting the number of the rising edges or trailing edges of the signals KA and KB, the result is eight pitches S̲ (cycles) of the optical grid 11. By displaying these, it is possible to measure the distance of movement of the optical grid 11, that is, the glass scale 10. Further, for differentiating the direction of movement of the glass scale 10, if taking note of the rising edge of the signal KB, when the glass scale 10 moves in the A direction, the signal KA becomes "1", while when the direction of movement is B, it becomes "0", so differentiation is possible.

Figure 18:
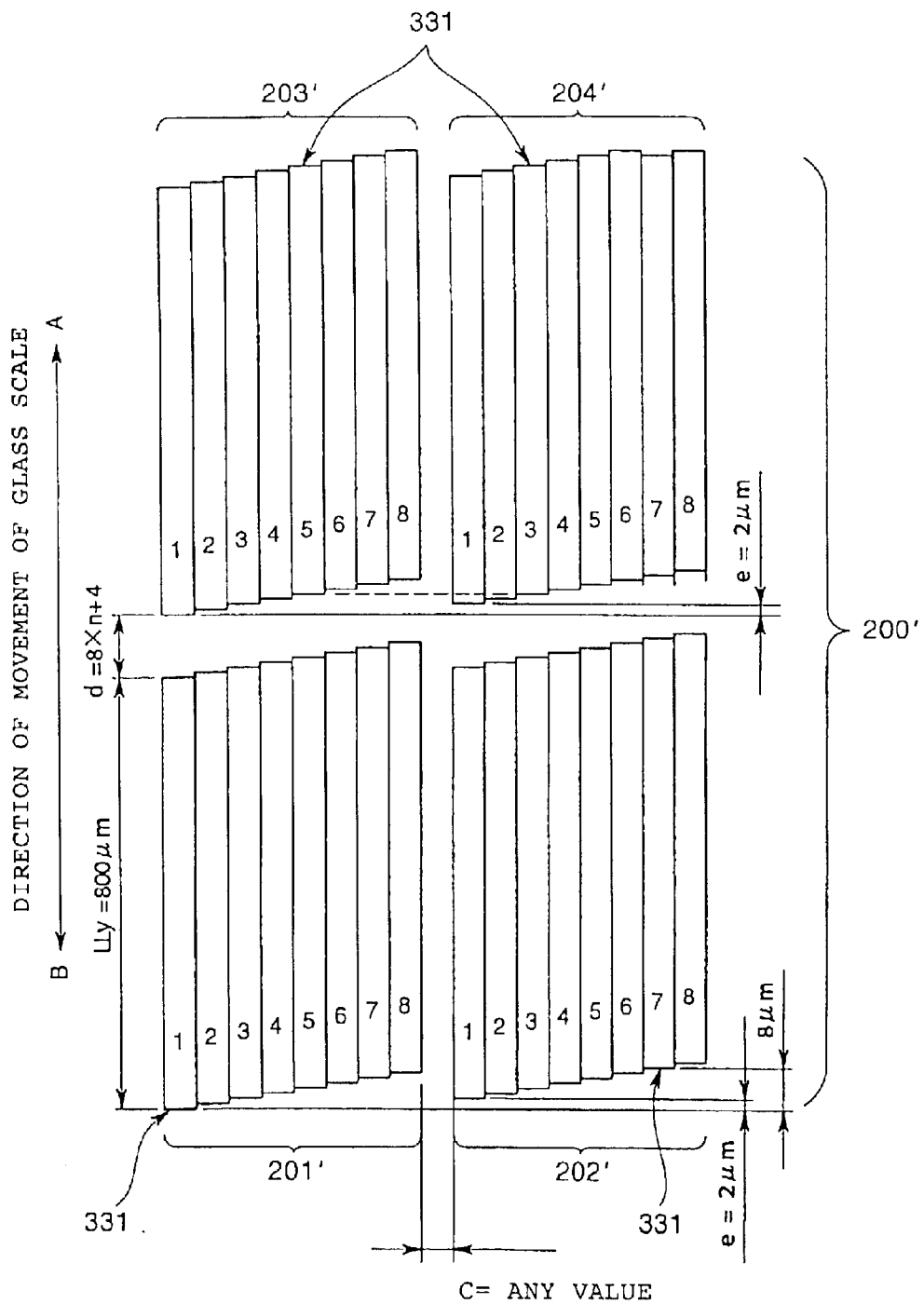
FIG. 18 is a view of the arrangement of light receiving element groups according to a third embodiment.

FIG. 18 shows a third embodiment of the present invention and shows the overall configuration of an aggregate 200' of the light receiving element groups. The aggregate 200' of light receiving element groups is comprised of the light receiving element groups 201' to 204'. The positional relationships of the light source 1, glass scale 10, and board 20 are similar to those of FIG. 12.

The configuration of the light receiving element array group 201' in the aggregate 200' of light receiving element groups is the same as that of the light receiving element array group 201 in the aggregate 200 of light receiving element groups of the first embodiment explained in FIG. 16. Further, the configurations of the other light receiving element array groups 202' to 204' in the aggregate 200' of the light receiving element groups are exactly the same as that of the light receiving element array group 201'. Further, these four light receiving element groups are arranged shifted relative to each other by a set distance. The distance C between the light receiving element group 201 and the light receiving element group 202 may be any distance.

In FIG. 18, the explanation will be given taking note of only the light receiving element array 331 in the light receiving element group 201'. The light receiving element array 331 is the array shown by the numeral 1 in the light receiving element group 201' (hereinafter referred to as the "first array"). After this, similarly, the light receiving element arrays 332 to 338 are referred to as the second array to the eighth array. The light receiving element group 202' is arranged shifted in the A direction of the direction of movement A-B of the glass scale by exactly 2 μm from the light receiving element array 201'. The first to eighth arrays of the light receiving element group 201' are arranged shifted by 1 μm increments in the A direction of the direction of movement A-B of the glass scale. Further, the pitch $\underline{S}$ of the optical grid 11 of the glass scale is 8 μm.

Thus, among the first to eighth arrays of the light receiving element group 202', the one at the same position relative to the glass scale 10 as the first array of the light receiving element group 201' is the seventh array. That is, the first array of the light receiving element group 201' and the seventh array of the light receiving element group 202' emit the same signal by the movement of the glass scale 10. Thus, the seventh array of the light receiving element group 202' corresponds to the light receiving element array 331.

Similarly, the arrays of the light receiving element group 201' and light receiving element group 202' correspond to each other on a 1 to 1 basis in all numbers as shown below. That is, the first array to sixth array of the light receiving element group 202' correspond to the third array to eighth array of the light receiving element group 201', while the seventh array and eighth array of the light receiving element group 202' correspond to the first array and second array of the light receiving element group 201'.

Next, the first array of the light receiving element group 203' is arranged at a position of a whole multiple of the pitch $\underline{S}$ (=8 μm) of the optical grid 11 plus 4 μm with respect to the first array of the light receiving element group 201'. In FIG. 18, LLy+d corresponds to this. Since LLy=800 μm and d=8×n (n is a whole number)+4 μm, this can be confirmed.

By arranging them in this way, the array at the same position relative to the optical grid 11 of the glass scale 10 as the first array of the light receiving element group 201' is the fifth array. This is because the first array of the light receiving element group 203' is shifted by 4 μm from a whole multiple of the pitch $\underline{S}$ of the optical grid 11 and the fifth array is further shifted by 4 μm from the first array. Thus, the same signal is output from the first array of the light receiving element group 201' and the fifth array of the light receiving element group 203', so the fifth array corresponds to the light receiving element array 331.

Similarly, the arrays of the light receiving element group 201' and the light receiving element group 203' correspond 1 to 1 in all numbers as shown below. That is, the first array to fourth array of the light receiving element group 201' correspond to the fifth array to eighth array of the light receiving element group 203', while the fifth array to eighth array of the light receiving element group 201' correspond to the first array to fourth array of the light receiving element group 203'.

Further, the first array of the light receiving element group 204' is arranged at a position shifted in the A direction of the direction of movement A-B of the glass scale 10 by exactly 2 μm with respect to the first array of the light receiving element group 203'. Therefore, the first array of the light receiving element group 204' is arranged at a position of a whole multiple of 8 μm plus 6 μm with respect to the first array of the light receiving element group 201'.

By arranging them in this way, the array at the same position relative to the optical grid 11 of the glass scale 10 as the first array of the light receiving element group 201' is the third array. This is because the first array of the light receiving element group 204' is shifted by 6 μm from the whole multiple of the pitch $\underline{S}$ of the optical grid 11, while the third array is shifted by a further 2 μm from the first array. Thus, the same signal is emitted from the first array of the light receiving element group 201' and the third array of the light receiving element group 204', so the third array corresponds to the light receiving element array 331.

Similarly, the arrays of the light receiving element groups 201' and light receiving element group 204' correspond 1 to 1 in all numbers as shown below. That is, the first array to sixth array of the light receiving element group 201' correspond to the third array to eighth array of the light receiving element group 204', while the seventh array and eighth array of the light receiving element group 201' correspond to the first array and second array of the light receiving element group 204'.

Thus, due to movement of the glass scale 10, taking note of the light receiving element arrays 331 from which the same signal is output, the first array in the light receiving element group 201', the seventh array in the light receiving element group 202', the fifth array in the light receiving element group 203', and the third array in the light receiving element group 204' correspond to the light receiving element arrays 331. Thus, it is understood that the light receiving element arrays 331 are arranged dispersed among the four light receiving element groups 201' to 204'.

It is understood that the remaining light receiving element arrays 332 to 338 are dispersed in the same way as the light receiving element arrays 331. That is, it is understood that there are four dispersed light receiving element arrays generating the same signal.

From this, in this embodiment as well, it is understood that there are a plurality of light receiving elements having specific positional information and there are a plurality of dispersed light receiving element arrays comprised of pluralities of light receiving elements having that specific positional information. Therefore, when the illuminance of the light source is uneven or spotty or when the glass scale 10 is scratched or dirty, the effect is suffered a bit by all of the light receiving elements of the positional information and averaged out, so it is possible to prevent any detrimental effect on the measurement precision.

The processing of the signals obtained from the aggregate 200 of the light receiving element groups of the third embodiment shown in FIG. 18 is similar to the mode explained in FIG. 16, so its explanation will be omitted.

Figure 19:
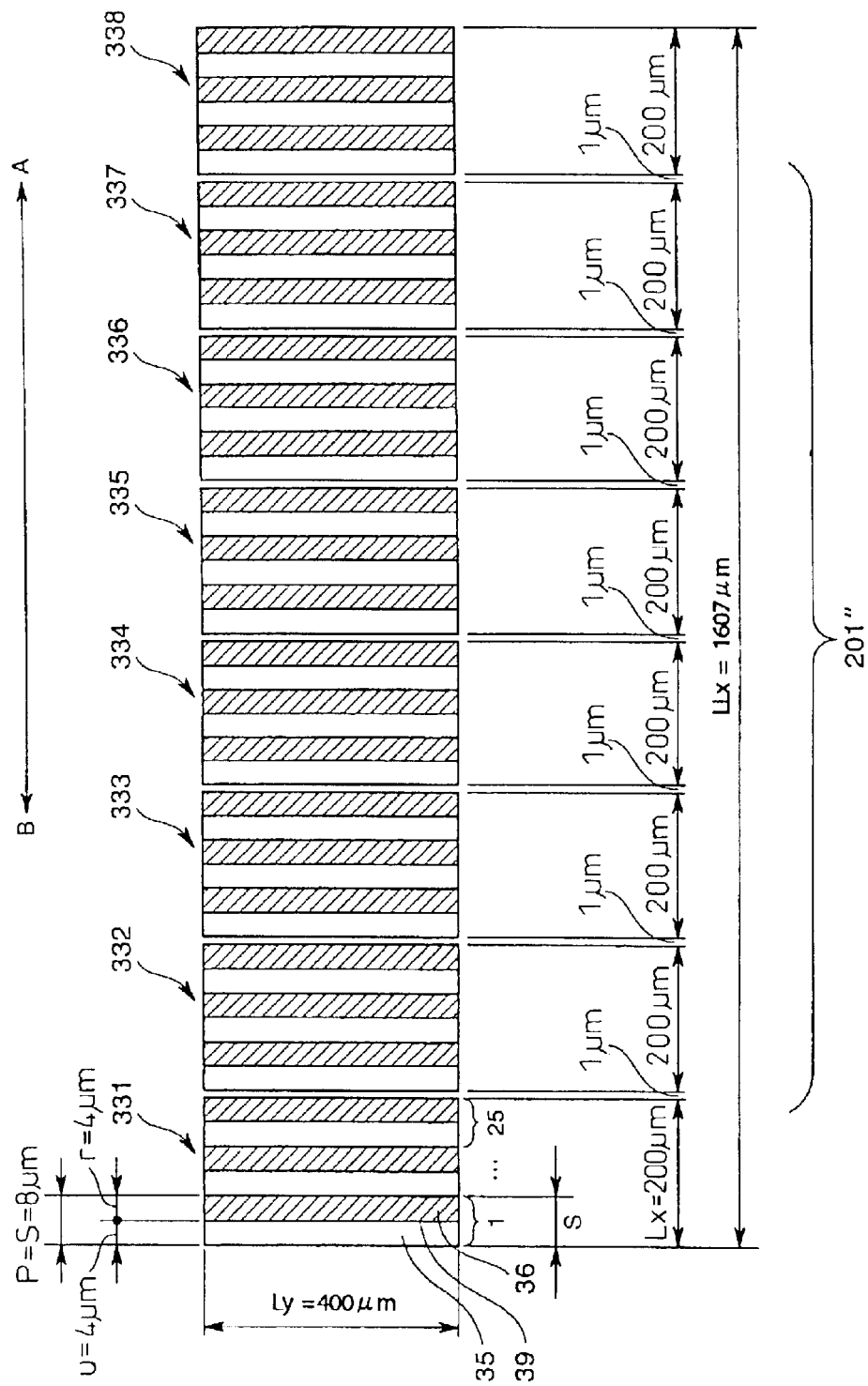
FIG. 19 is a view of the arrangement of light receiving element groups according to a fourth embodiment.
Figure 20:
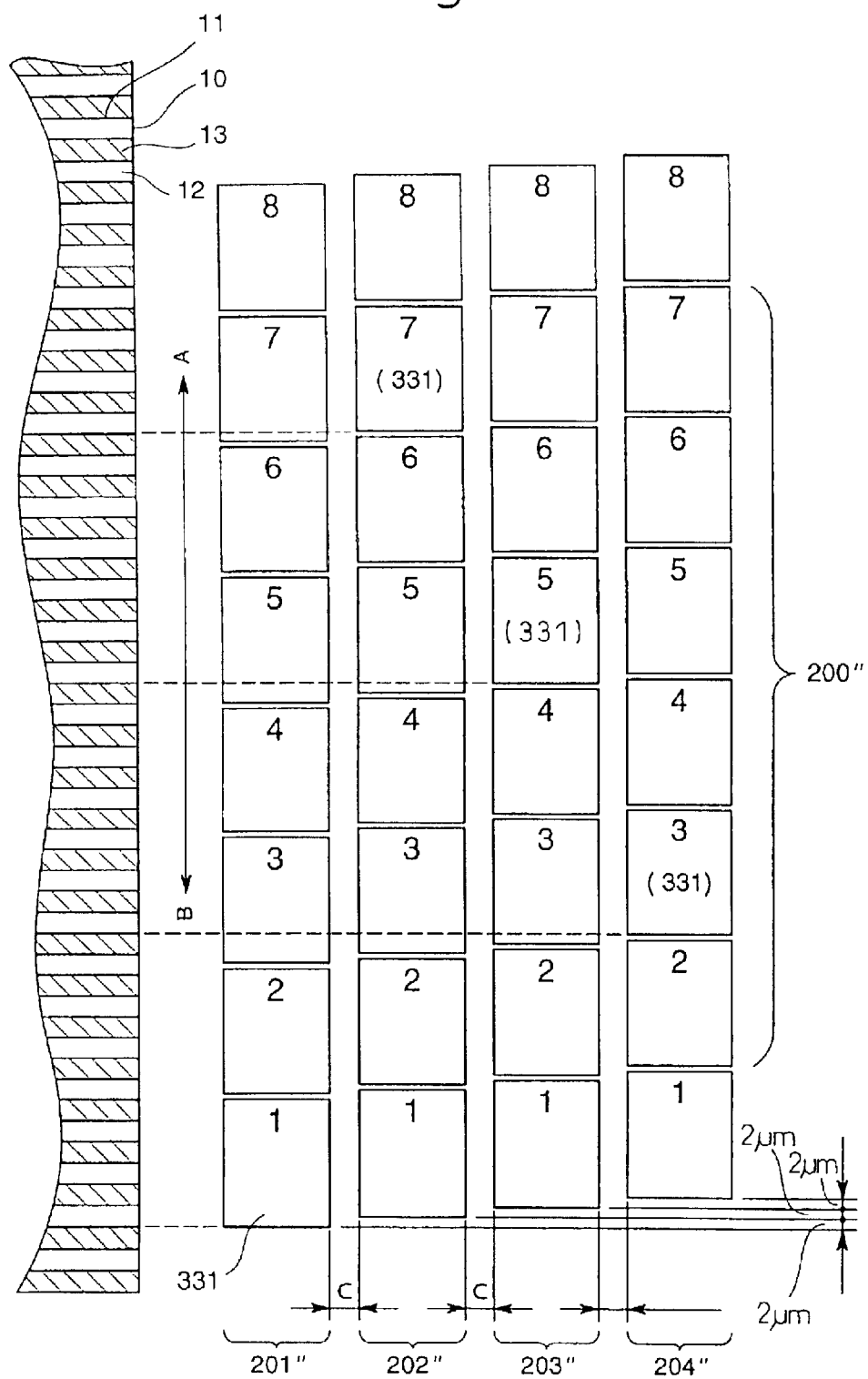
FIG. 20 is a view of the relationship between an optical grid and light receiving element groups according to the fourth embodiment.

FIGS. 19 and 20 show a fourth embodiment of the present invention. The positional relationships of the light source 1, glass scale 10, and board 20 are the same as in the configuration explained in FIG. 12. In the fourth embodiment, however, as shown in FIG. 20, the aggregate 200 of the light receiving element groups is changed to the aggregate 200' of the light receiving element groups.

In the second and third embodiments of the present invention, the light receiving element arrays 331 to 338 in the light receiving element groups 201 to 204 and 201' to 204' were arranged adjoining in the direction perpendicular to the direction of movement of the glass scale 10, while the adjoining light receiving element arrays 331 to 338 were arranged shifted in the direction of movement of the glass scale 10 by 1 μm increments.

On the other hand, in the fourth embodiment of the present invention, as shown in FIG. 20, the four light receiving element groups 201" to 204" are arranged in parallel at spaces of a predetermined distance C in the direction of movement of the glass scale 10. Further, the light receiving element groups 201" to 204" are comprised of light receiving element arrays 331 to 338, the light receiving element arrays 331 to 338 are arranged in the direction perpendicular to the direction of movement of the glass scale, and spaces of 1 μm are provided between the adjoining light receiving element arrays.

The light receiving element arrays 331 to 338, as shown in FIG. 19, are comprised of pluralities of light receiving elements 39. Each light receiving element 39 is comprised of a valid light receiving portion 35 able to receive light and an invalid light receiving portion 36 not able to receive light. P shows the width of the light receiving elements 39, u shows the width of the valid light receiving portion 35, and r shows the width of the invalid light receiving portion. Here, the width P of the light receiving element 39 is set to the pitch S of the optical grid 11, while the width u of the valid light receiving portion 35 and the width r of the invalid light receiving portion are set to S/2, respectively.

As will be understood from FIG. 19, the eight light receiving element arrays 331 to 338 are all comprised of the same dimensions. Each of the light receiving element arrays 331 to 338 is comprised of 25 light receiving elements 39 arranged in the lateral direction (direction parallel to A-B) (for convenience in illustration, only three of the light receiving elements 39 are drawn by broken lines) and one light receiving element 39 in the longitudinal direction (direction perpendicular to A-B).

The pitch P of each light receiving element 39 is set to 8 μm in the same way as the pitch S of the optical grid 11. Further, the width u of the valid light receiving portion and the width r of the invalid light receiving portion are set to 4 μm in the same way as the transparent portions 12 and nontransparent portions 13 of the optical grid 11. Therefore, the length Lx of one light receiving element array in the lateral direction becomes 200 μm (8 μm×25). Further, the total length LLx of each light receiving element group is 1607 μm (8 μm×200+7 μm). Further, the length q of each light receiving element is set to 400 μm, so the length Ly of each of the light receiving element arrays 331 to 338 is also 400 μm.

Here, the light receiving element array 331 at the left end of the glass scale 10 in the direction of movement B in the light receiving element group 201" is placed in the same positional relationship relative to the transparent portions 12 and nontransparent portions 13 of the glass scale 10. If doing this, the light receiving element array 331 has the same relationship with the light receiving element array 331 shown in the second and third embodiments.

The second light receiving element array from the left in the light receiving element group 201" is shifted by 1 μm with respect to the light receiving element array 331. This results in the same relationship with the light receiving element array 332 shown in the second embodiment. Similarly, the third array from the left in the light receiving element group 201", corresponds to the light receiving element array 333, the fourth array from the left the light receiving element array 334, etc. The light receiving element array at the right end corresponds to the light receiving element array 338.

The light receiving element group 202" is arranged in the direction perpendicular to the direction of movement of the glass scale 10 and shifted by 2 μm in the A direction of the direction of movement A-B of the glass scale 10. The light receiving element group 203" is similarly arranged shifted by 2 μm with respect to the light receiving element group 202", while the light receiving element group 204" is similarly arranged shifted by 2 μm with respect to the light receiving element group 203". These four light receiving element group 201", light receiving element group 202", light receiving element group 203", and light receiving element group 204" are exactly the same in configuration, but differ in positions relative to the glass scale 10.

Now, take note of the light receiving element array 331 in the light receiving element group 201". The light receiving element array of the light receiving element group 202" at the same position relative to the glass scale 10 as the light receiving element array 331 of the light receiving element group 201" is the seventh light receiving element array. This corresponds to the light receiving element array 331. Similarly, the light receiving element array 331 of the light receiving element group 201" corresponds to the seventh light receiving element array of the light receiving element group 203" and the third light receiving element array of the light receiving element group 204".

The remaining light receiving element arrays 332 to 338 of the light receiving element group 201" also correspond to some numbers of light receiving element arrays of the light receiving element group 202" to light receiving element group 204".

Therefore, the light receiving element arrays 331 outputting the same signals due to movement of the glass scale 10 become the first array in the light receiving element group 201", the seventh array in the light receiving element group 202", the fifth array in the light receiving element group 203", and the third array in the light receiving element group 204". It is understood that other light receiving element arrays 332 to 338 outputting the same signals are similarly dispersed. That is, it is understood that light receiving element arrays outputting the same signals are dispersed at four locations of the light receiving element groups 201" to 204".

From this, in this embodiment as well, it is understood that there are a plurality of light receiving elements having specific positional information and there are a plurality of dispersed light receiving element arrays comprised of pluralities of light receiving elements having that specific positional information. Therefore, when the illuminance of the light source is uneven or spotty or when the glass scale 10 is scratched or dirty, the effect is suffered a bit by all of the light receiving elements of the positional information and averaged out, so it is possible to prevent any detrimental effect on the measurement precision.

The processing of the signals output from the aggregate 200" of the light receiving element groups is similar to the second and third embodiments, so its explanation will be omitted.

In the second to fourth embodiments, the example was shown of four light receiving element groups, but the number of the light receiving element groups is not limited to four. Any number is possible if the light is dispersed from a light source which is not normal. Further, the distance of shifting the light receiving element groups and the distance of shifting the light receiving element arrays are of course also not limited to the above values so long as similar effects to the above embodiments are obtained.

In this way, according to the second to fourth embodiments of the present invention, since there are a plurality of light receiving elements having specific positional information and there are a plurality of dispersed light receiving element arrays comprised of pluralities of light receiving elements having that specific positional information, when the illuminance of the light source is uneven or spotty or when the glass scale 10 is scratched or dirty, the effect is suffered a bit by all of the light receiving elements of the positional information and averaged out, so it is possible to prevent any detrimental effect on the measurement precision.

Figure 21:
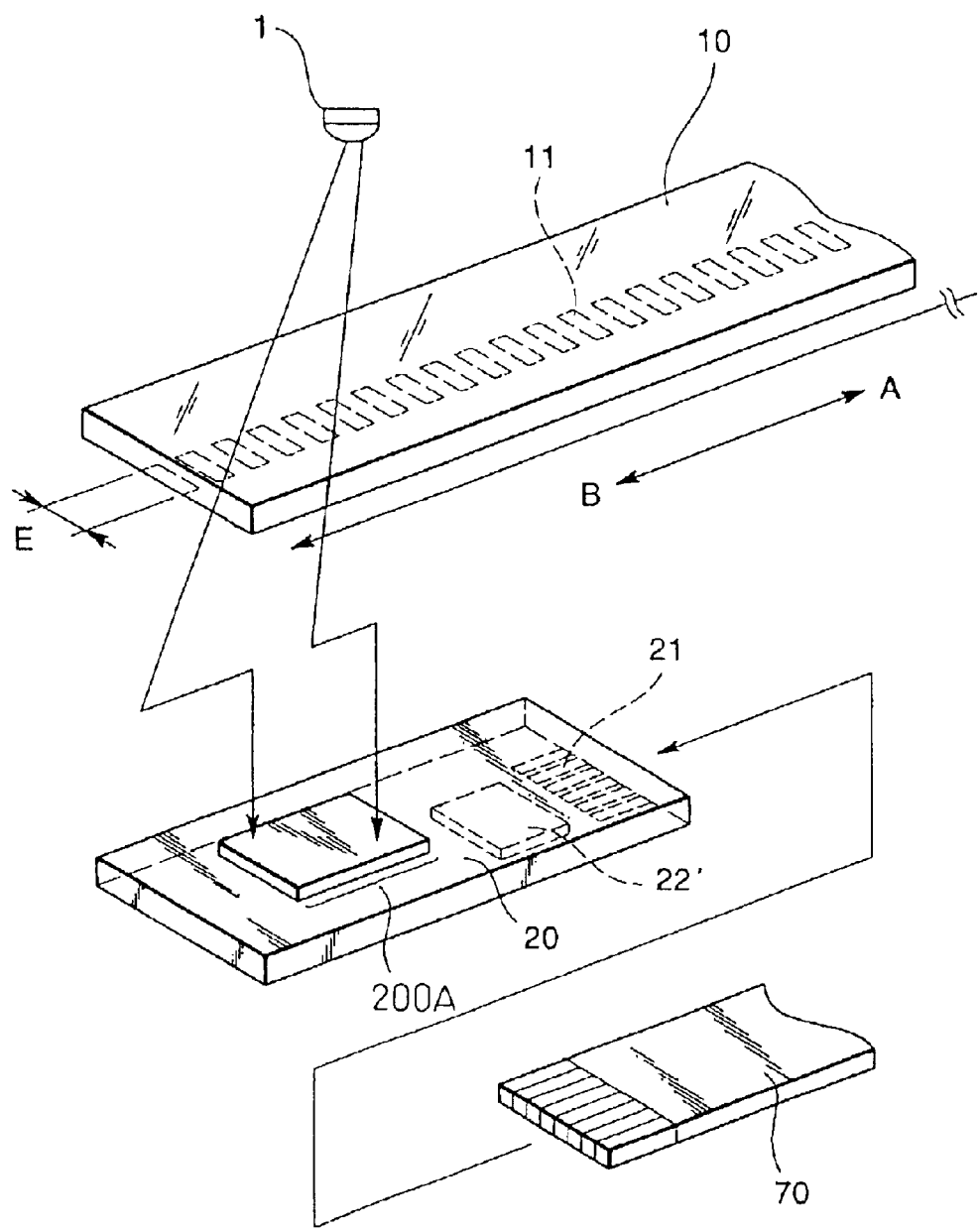
FIG. 21 is a schematic view of the configuration of an optical displacement measurement apparatus according to fifth to 10th embodiments of the present invention.

FIG. 21 shows the configuration of a photoelectric transmission type linear encoder to which fifth to 10th embodiments of the present invention are applied and shows one embodiment of the internal configuration of the contact type digital displacement meter 40 explained in FIG. 1. Reference numeral 10 is a glass scale provided with an optical grid 11, while reference numeral 1 is a light source for emitting parallel light to the glass scale 10. Reference numeral 200A is an aggregate of light receiving elements for receiving light passing through the glass scale 10. Reference numeral 22 is a semiconductor integrated circuit (IC chip) for position processing. Reference numeral 21 is a terminal for connecting with a cable 70. The cable 70 supplies power or transmits signals to a display device or other external device. The aggregate 200A of light receiving elements, a semiconductor integrated circuit 22, and a terminal 21 are mounted on the board 20.

Figure 22:
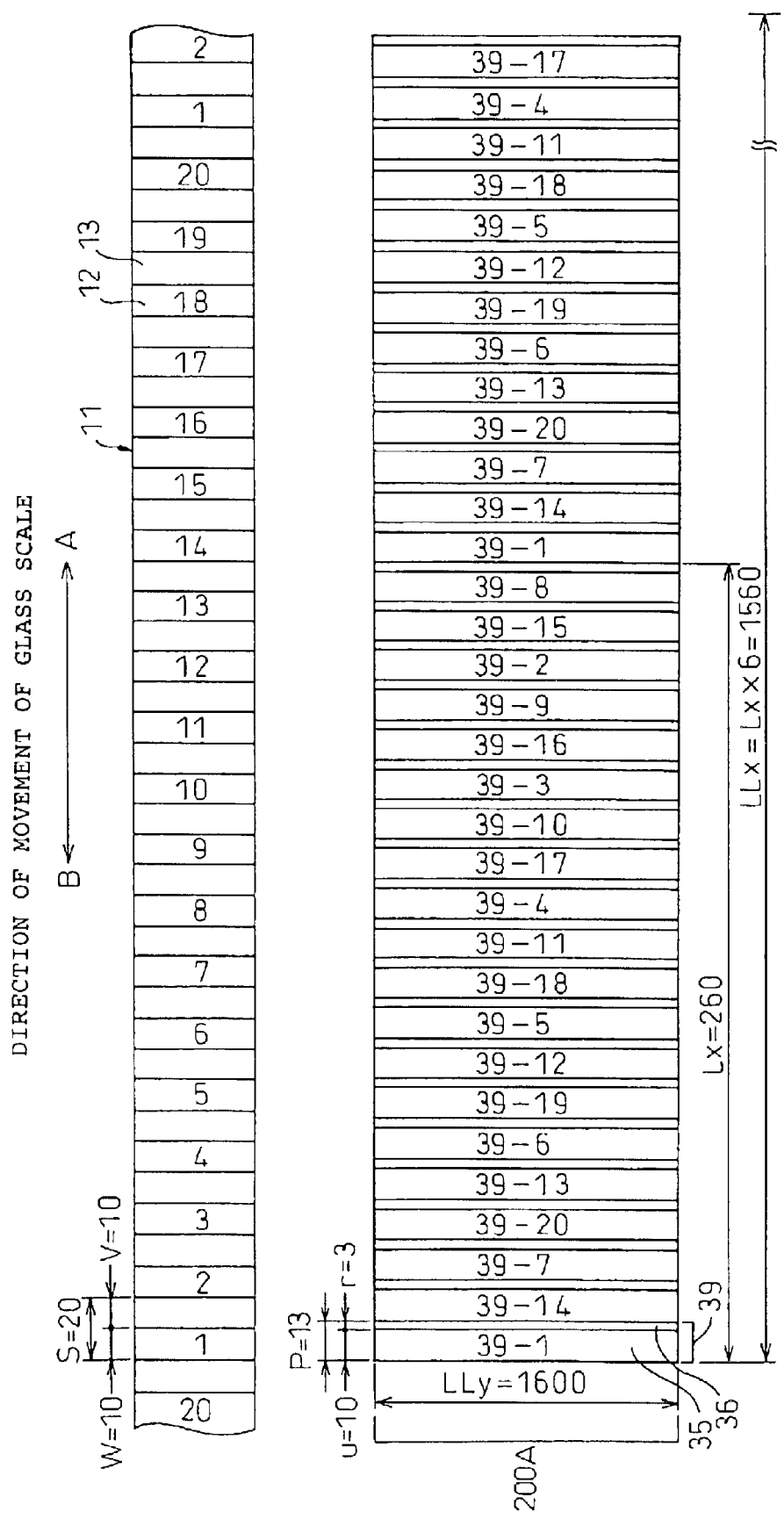
FIG. 22 is a view of the relationship between an optical grid and light receiving element groups according to a fifth embodiment.

FIG. 22 shows details of the optical grid 11 and aggregate 200A of light receiving elements in the fifth embodiment of the present invention. Twenty light receiving elements 39-1 to 39-20 are arranged in parallel in the direction of movement A-B of the glass scale 10 shown by the arrow A-B. $\underline{W}$ shows the width of a transparent portion 12 of the optical grid 11, while $\underline{V}$ shows the width of a nontransparent portion 13 of the optical grid 11. Here, the width $\underline{W}$ of the transparent portion 12 of the optical grid 11 and the width V of the nontransparent portion 13 are set to S/2, respectively. If for example the pitch $\underline{S}$ of the optical grid 11 of the glass scale 10 is set to 20 μm, the width $\underline{W}$ of the transparent portion 12 of the optical grid 11 is 10 μm and the width $\underline{V}$ of the nontransparent portion of the optical grid 11 is also 10 μm.

The aggregate 200A of the light receiving elements is comprised of a plurality of light receiving elements 39-1 to 39-20. Each light receiving element 39 is comprised of a valid light receiving portion 35 able to receive light and an invalid light receiving portion 36 unable to receive light. $\underline{P}$ indicates the width of a light receiving element 39, $\underline{u}$ indicates the width of the valid light receiving portion 35, and $\underline{r}$ indicates the width of the invalid light receiving portion. Here, the width $\underline{u}$ of the valid light receiving portion 35 is the same as the width $\underline{W}$ of the transparent portion 12 of the optical grid 11, but the width $\underline{r}$ of the invalid light receiving portion is smaller than the width $\underline{V}$ of the nontransparent portion 13 of the optical grid 11. Therefore, the pitch $\underline{P}$ of each light receiving element 39 is made smaller than the pitch $\underline{S}$ of the optical grid 11.

As will be understood from FIG. 22, one group is comprised of 20 light receiving elements 39-1 to 39-20 arranged in a direction parallel to the direction of movement A-B of the glass scale. The light receiving elements 39-1 to 39-20 are all of the same dimensions. Six such groups are arranged in the direction of movement of the glass scale (FIG. 22 shows only part of the six groups). Further, one light receiving element 39 is arranged in the direction perpendicular to the direction of movement A-B of the glass scale.

The width $\underline{u}$ of the valid light receiving portion 35 of each light receiving element 39 is set to 10 μm in the same way as the width $\underline{W}$ of the transparent portion 12 of the optical grid 11, while the width $\underline{r}$ of the invalid light receiving portion 36 is set to 3 μm or smaller than the width $\underline{V}$ of the nontransparent portion 13 of the optical grid 11. Therefore, the pitch $\underline{P}$ of each light receiving element 39 is made 13 μm or smaller than the pitch $\underline{S}$ of the optical grid 11. Therefore, the length Lx of each light receiving element group in the lateral direction becomes 260 μm (13 μm×20). Therefore, the length LLx of the aggregate 200 of the light receiving elements 39 in the direction of movement of the glass scale is 1560 μm (260 μm×6) since there are six light receiving element groups. Further, the length LLy of each light receiving element array is set to 1600 μm.

FIG. 22 will be used to explain the content of a light receiving element group in detail. A transparent portion 12 of the optical grid 11 of the glass scale and the valid light receiving portion 35 of the light receiving element 39-1 in the light receiving element group are made to match. By doing this, since N is made a number of 1 to 20 and the light receiving element 39-N next to the light receiving element 39-1 has a light receiving element pitch $\underline{P}$ of 13 μm, by movement of the glass scale 10 in the A direction by exactly 13 μm, the transparent portion 12 of the optical grid 11 of the glass scale and the valid light receiving portion 35 match. Therefore, this light receiving element 39-N is designated as the light receiving element 39-14.

Further, since M is a number from 1 to 20 and the adjoining light receiving element 39-M is two pitches away, that element is at a position 26 μm from the light receiving element 39-1, but the pitch of the optical grid 11 of the glass scale 10 is 20 μm, so when the glass scale 10 moves by 6 μm, the transparent portion 12 of the optical grid 11 of the glass scale and the valid light receiving portion 35 match. Therefore, this light receiving element 39-M is designated as the light receiving element 39-7.

In this way, if Q is made a number of 1 to 20, the number Q of the light receiving element 39-Q is increased by 13 at a time starting from 1, and the number Q of the light receiving element 39-Q is determined by the result of calculation by a module 20 (provided, however, that Q>0 is replaced with Q=Q−20), the numbers from Q=1 to 20 all appear in one light receiving element group. Further, the number Q minus 1 corresponds to the amount of shift from the transparent portion 12 of the optical grid 11 of the glass scale, that is, the position shifted in the A direction of the direction of movement A-B of the glass scale 10.

The least common multiple of the pitch $\underline{P}$ (=13 μm) of the light receiving elements 39 and the pitch $\underline{S}$ (=20 μm) of the optical grid 11 is 260 μm. Therefore, it is understood that a light receiving element group 39 repeats every 260 μm. That is, it is understood that the head of the next group also becomes the light receiving element 39-1 and that it is at the same position relative to the optical grid 11 as the head light receiving element 39-1 of the previous group.

In this way, it is understood that the light receiving elements having the same number Q in the groups have the same amount of shift from the transparent portions 12 of the optical grid 11 of the glass scale and that the outputs obtained by movement of the glass scale 10 are also the same. Therefore, 20 different types of output signals are obtained from the light receiving elements 39-1 to 39-20 for the pitch S (=20 μm) of the glass scale 10. Further, since the 20 different types of output signals are shifted in phase corresponding to 1 μm each, these signals may be processed to obtain signals expressing each 1 μm. This processing will be explained later.

Figure 23:
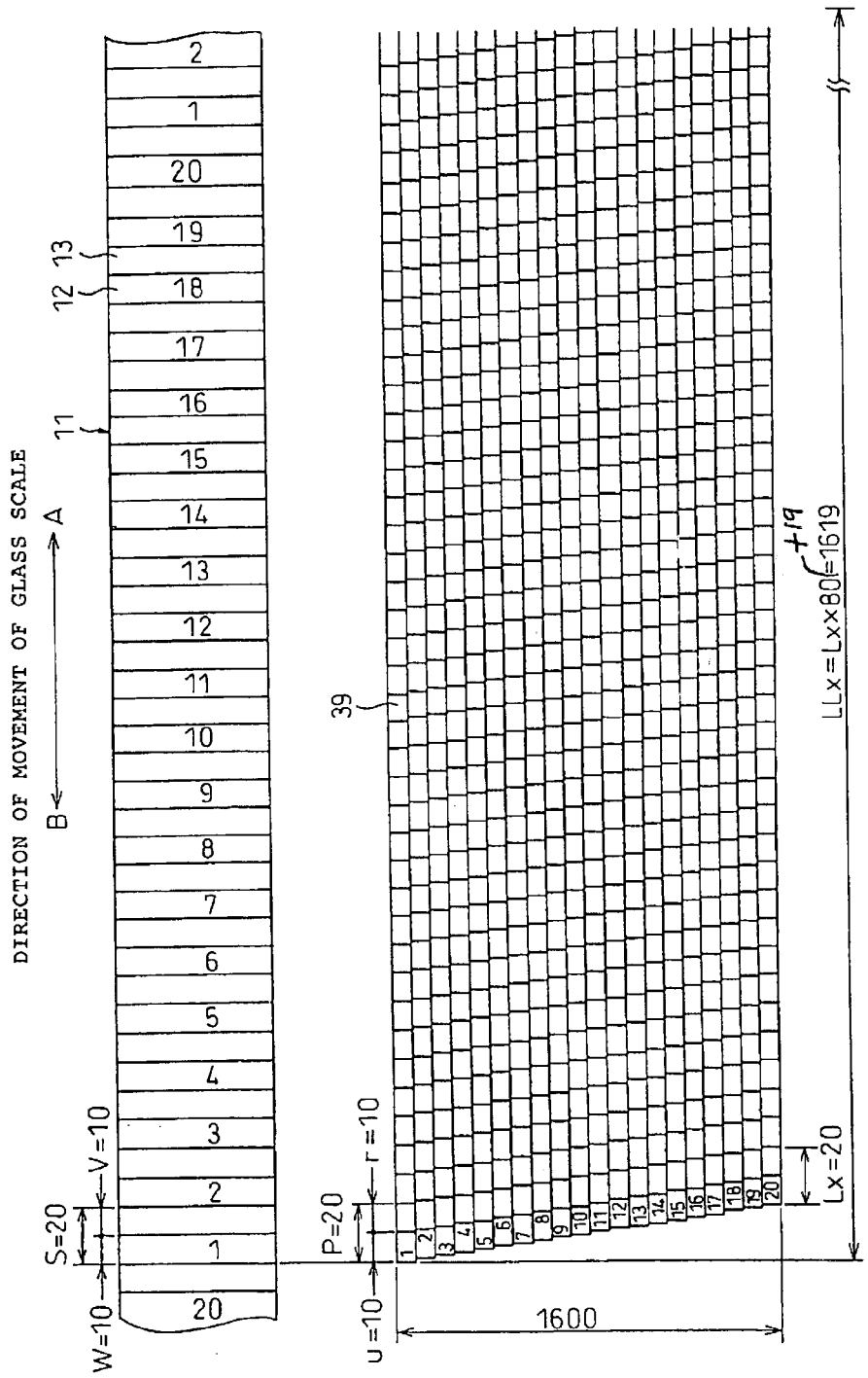
FIG. 23 is a comparative view of a light receiving element array of a conventional configuration emitting a signal every 1 $\mu$m the same as in the present invention.

The signals the same as in the fifth embodiment may be prepared in the fashion of FIG. 23. In FIG. 23, when the pitch S of the optical grid 11 of the glass scale is 20 μm, the width W of the transparent portion 12 of the optical grid 11 is 10 μm, and the width V of the nontransparent portion of the optical grid 11 is also 10 μm, the width u of the valid light receiving portion of a light receiving element 39 becomes 10 μm and the width r of the invalid light receiving portion becomes 10 μm. In this way, 80 light receiving elements 39 are arranged parallel to the direction of movement of the glass scale 10 to form an array. A total of 20 arrays the same as this are arranged in the A direction of the direction of movement of the glass scale 10 shifted by 1 μm increments. By doing this, since the light receiving elements 39 in the arrays are at the same positions relative to the optical grid 11, the outputs accompanying movement of the glass scale 11 in the arrays are the same. Therefore, 20 different outputs are obtained from each array. These are shifted by phases corresponding to 1 μm, so these signals may be processed to obtain signals expressing each 1 μm.

Here, the total area of one valid light receiving portion of a signal obtained by the configuration of FIG. 23 and the total area of one valid light receiving portion of a signal obtained by the fifth embodiment of the present invention will be compared. In both cases, the overall size of the light receiving elements is set about the same to about 1600 μm×1600 μm. The area of the configuration of FIG. 23 is u μm×Ly μm×n (number)=64,000 μm², while the area of fifth embodiment is 10×1600 μm×6=96,000 μm. Therefore, according to the present invention, even if the overall size of the light receiving elements is the same, 1.5 times the output is obtained.

Further, when the illuminance of the light source is uneven or spotty or when the glass scale is scratched or dirty, as will be understood from a comparison of FIG. 22 and FIG. 23, since the light receiving elements 39-1 of FIG. 22 are arranged dispersed at equal intervals, the effect is resisted. As opposed to this, the light receiving element of the first array corresponding to the light receiving element 39-1 of FIG. 23 is susceptible to the effects since there is only one array.

According to the fifth embodiment, since the width of the valid light receiving portion of a light receiving element is made to be larger than the width of the invalid light receiving portion, the area of the valid light receiving portion of the light receiving element can be increased at the portion struck by light, greater resistance to noise can be obtained, and a detrimental effect on the measurement precision can be prevented.

Further, since there are a plurality of dispersed light receiving elements having specific positional information and even when the illuminance of the light source is uneven or spotty or the glass scale is scratched or dirty, the effect is dispersed and averaged out by all the light receiving elements of the positional information, it is possible to prevent this from having a detrimental effect on the measurement precision.

Figure 24:
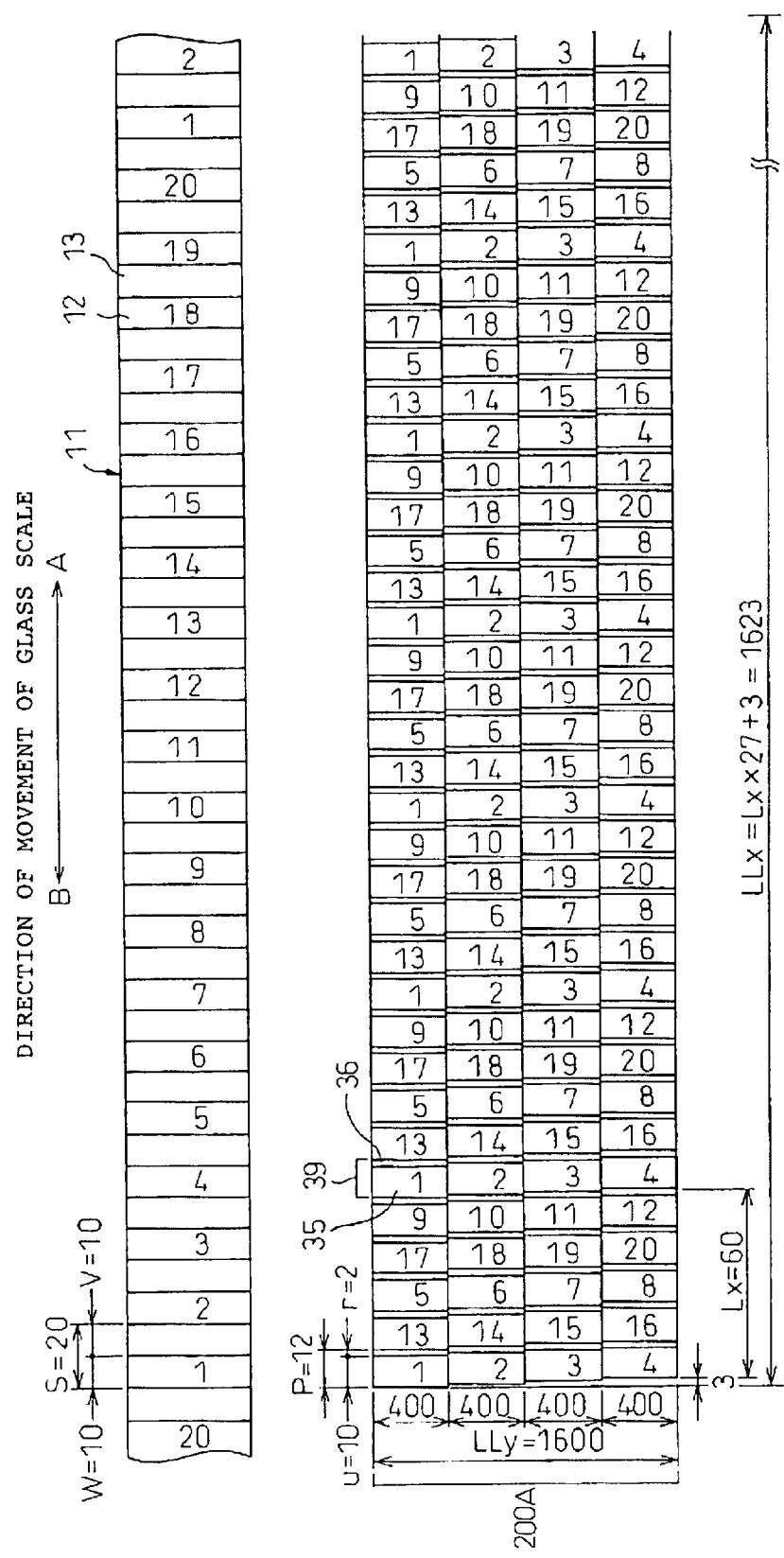
FIG. 24 is a view of an optical grid and light receiving element groups according to a sixth embodiment.

FIG. 24 shows the configuration of a sixth embodiment of the present invention. In the sixth embodiment, the positional relationships of the light source 1, glass scale 10, and board 20 are similar to the configuration explained in FIG. 21. In the sixth embodiment, however, as shown in FIG. 24, the configuration of the aggregate 200A of light receiving elements differs from the fifth embodiment.

FIG. 24 shows details of the optical grid 11 and the aggregate 200A of light receiving elements. In the sixth embodiment, 20 light receiving elements 39-1 to 39-20 (in the figure, shown by the numbers 1 to 20) form one group. Each group is comprised of the 20 light receiving elements arranged five in the direction parallel to the direction of movement A-B of the glass scale 10 and arranged four in the direction perpendicular to the direction of movement of the glass scale 10. Each array is arranged shifted by 1 μm in the A direction of the direction of movement of the glass scale 10. If the pitch S of the optical grid 11 of the glass scale 10 is set to 20 μm, the width W of the transparent portion 12 of the optical grid 11 is 10 μm and the width V of the nontransparent portion 13 of the optical grid 11 is also 10 μm.

As will be understood from FIG. 24, the light receiving elements 39-1 to 39-20 in each group comprised of five light receiving elements 39 arranged in the direction of movement A-B of the glass scale 10 and four in the direction perpendicular to the direction of movement A-B of the glass scale 10, that is, the total 20, are all of the same dimensions. In the sixth embodiment, 27 such groups are arranged in the direction of movement of the glass scale 10. The width u of the valid light receiving portion 35 of each light receiving element 39 is set to 10 μm in the same way as the width W of the transparent portion 12 of the optical grid 11, while the width r of the invalid light receiving portion 36 is set to 2 μm or smaller than the width V of the nontransparent portion 13 of the optical grid 11. Therefore, the pitch P of each light receiving element 39 is made 12 μm or smaller than the pitch S of the optical grid 11. Therefore, the length Lx of each light receiving element group in the lateral direction becomes 60 μm (=12 μm×5). Therefore, the length LLx of the aggregate 200A of light receiving elements 39 in the direction of movement of the glass scale 10 becomes 1623 μm (=60 μm×27+3 μm) since there are 27 light receiving element groups. Further, the length Ly of each light receiving element array is set to 400 μm, so the length LLy in the direction perpendicular to the direction of movement of the glass scale 10 is set to 1600 μm.

FIG. 24 will be used to explain the content of a light receiving element group in detail. A transparent portion 12 of the optical grid 11 of the glass scale and the valid light receiving portion 35 of the light receiving element 39-1 in the light receiving element group are made to match. By doing this, since the light receiving element 39-N of the first array next to the light receiving element 39-1 has a light receiving element pitch P of 12 μm, when the glass scale 10 moves in the A direction by exactly 12 μm, the transparent portion 12 of the optical grid 11 of the glass scale and the valid light receiving portion 35 match. Therefore, this light receiving element 39-N is designated as the light receiving element 39-13. Further, since the adjoining light receiving element 39-M is two pitches away, that element is at a position 24 μm from the light receiving element 39-1, but the pitch of the optical grid 11 of the glass scale 10 is 20 μm, so when the glass scale 10 moves by 4 μm, the transparent portion 12 of the optical grid 11 of the glass scale and the valid light receiving portion 35 match. Therefore, this light receiving element is designated as the light receiving element 39-5.

In this way, if the number Q of the light receiving element 39-Q is increased by 12 at a time starting from 1 and the number Q of the light receiving element 39-Q is determined by the result of calculation by a module 20 (provided, however, that Q>0 is replaced with Q=Q−20), there are five Qs, that is, 1, 13, 5, 17, and 9.

The head light receiving element 39-Q of the second array is shifted by 1 μm with respect to the light receiving element 39-1, that is, the transparent portion 12 of the optical grid 11 and the valid light receiving portion 35 are shifted by 1 μm, so the light receiving element 39-Q becomes the light receiving element 39-2. This array starts from Q=2. If Q is increased by 12 at a time and the result of calculation by the module 20 is made the number, five numbers are obtained for Q, that is, 2, 14, 6, 18, and 10.

The third array and the fourth array similarly start from Q=3 or Q=4. If adding 12 at a time to Q, the result calculated at the module 20 (provided, however, that Q>0 is replaced by Q=Q−20) is made the number and a Q of 3, 15, 7, 19, and 11 and a Q of 4, 16, 8, 20, and 12 are obtained. Therefore, the numbers from Q=1 to 20 all appear in each light receiving element group. Further, the number Q minus 1 corresponds to the amount of shift from the transparent portions 12 of the optical grid 11 of the glass scale 10, that is, the position shifted in the A direction of the direction of movement A-B of the glass scale 10.

The least common multiple of the 12 μm of the pitch $\underline{P}$ of the light receiving elements 39 and the 20 μm of the pitch $\underline{S}$ of the optical grid 11 is 60 μm. Therefore, it is understood that this group repeats every 60 μm. That is, it is understood that the head of the next group also becomes the light receiving element 39-1 and that it is at the same position relative to the optical grid 11 as the head light receiving element 39-1 of the previous group.

In this way, it is understood that the light receiving elements having the same number Q in a group have the same amount of shift from the transparent portions 12 of the optical grid 11 of the glass scale and that the outputs obtained by movement of the glass scale 10 are also the same. Therefore, 20 different types of output signals are obtained from the light receiving elements 39-1 to 39-20 for the 20 μm of the pitch $\underline{S}$ of the glass scale 10. Since the output signals are shifted by 1 μm increments, these signals may be processed to obtain signals expressing each 1 μm. This processing will be explained later.

Here, the total area of one valid light receiving portion of a signal obtained by the configuration of FIG. 23 and the total area of one valid light receiving portion of a signal obtained by the sixth embodiment of the present invention will be compared. In both cases, the overall size of the light receiving elements is set about the same to about 1600 μm×1600 μm. The area of the configuration of FIG. 23 is u μm×Ly μm×n (number)=64,000 μm², while the area of sixth embodiment is 10×400 μm×27=108,000 μm². Therefore, according to the present invention, even if the overall size of the light receiving elements is the same, 1.7 times the output is obtained.

In the sixth embodiment as well, in the same way as the fifth embodiment, since the light receiving elements having the same positional information are arranged dispersed and a large light receiving area is obtained, a large output signal is obtained and, even when the illuminance of the light source is uneven or spotty or when the glass scale is scratched or dirty, the effect is dispersed and averaged out by all of the light receiving elements of the positional information, so it is possible to prevent this from having a detrimental effect on the measurement precision.

Figure 25:
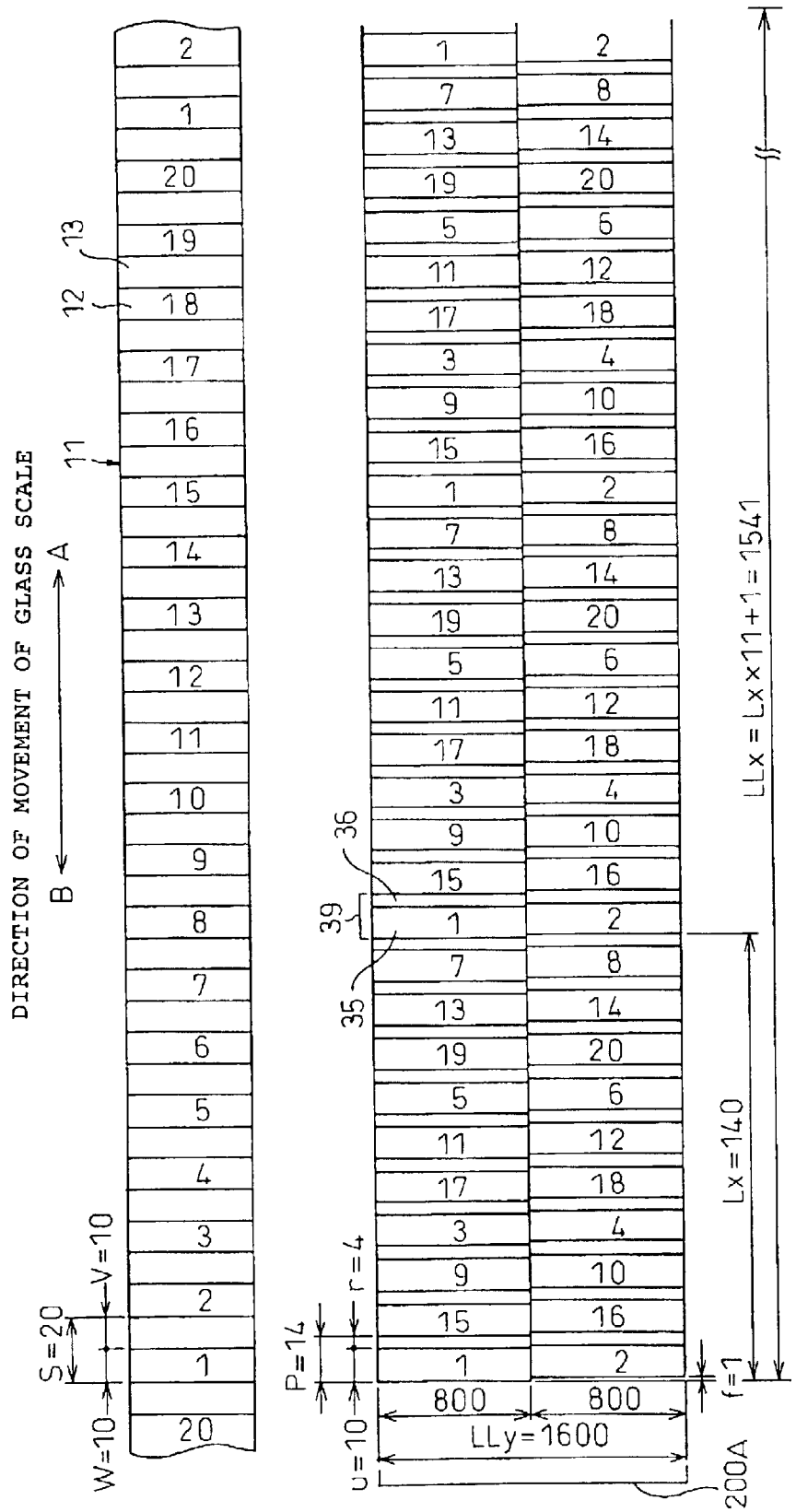
FIG. 25 is a view of an optical grid and light receiving element groups according to a seventh embodiment.

FIG. 25 shows details of the optical grid 11 and the aggregate 200A of the light receiving elements in a seventh embodiment of the present invention. The positional relationships of the light source 1, glass scale 10, and board 20 are similar to those of the configuration explained in FIG. 21. In the seventh embodiment, however, as shown in FIG. 25, the configuration of the aggregate 200A of the light receiving elements differs from that of the fifth embodiment.

FIG. 25 shows details of the optical grid 11 and the aggregate 200A of the light receiving elements. In the seventh embodiment, 20 light receiving elements 39-1 to 39-20 (in the figure, shown by the numbers 1 to 20) form one group. Each group is comprised of a total of 10 elements×2 arrays, that is, 10 elements in the direction of movement A-B of the glass scale 10 and two arrays in the direction perpendicular to the direction of movement of the glass scale 10. Each array is arranged parallel to the direction of movement A-B of the glass scale 10. The group of the second array is arranged shifted by 1 μm in the A direction of the direction of movement of the glass scale 10. If the pitch $\underline{S}$ of the optical grid 11 of the glass scale 10 is set to 20 μm, the width $\underline{W}$ of the transparent portion 12 of the optical grid 11 is 10 μm and the width $\underline{V}$ of the nontransparent portion 13 of the optical grid 11 is also 10 μm.

As will be understood from FIG. 25, each group is comprised of 10 light receiving elements in the direction of movement A-B of the glass scale 10 and two arrays in the direction perpendicular to the direction of movement A-B of the glass scale 10, that is, the total 20. The light receiving elements 39-1 to 39-20 are all of the same dimensions. In the seventh embodiment, 11 such groups are arranged in the direction of movement of the glass scale 10. The width $\underline{u}$ of the valid light receiving portion 35 of each light receiving element 39 is set to 10 μm in the same way as the width $\underline{W}$ of the transparent portion 12 of the optical grid 11, while the width $\underline{r}$ of the invalid light receiving portion 36 is set to 4 μm or smaller than the width $\underline{V}$ of the nontransparent portion 13 of the optical grid 11. Therefore, the pitch $\underline{P}$ of each light receiving element 39 is made 14 μm or smaller than the pitch $\underline{S}$ of the optical grid 11. Therefore, the length Lx of each light receiving element group in the direction of movement of the glass scale 10 becomes 140 μm (=14 μm×10). Therefore, the length LLx of the aggregate 200A of light receiving elements 39 in the direction of movement of the glass scale 10 becomes 1541 μm (=140 μm×11+1 μm) since there are 11 light receiving element groups. Further, the length Ly of each light receiving element array is set to 800 μm, so the length LLy in the direction perpendicular to the direction of movement of the glass scale 10 is 1600 μm.

FIG. 25 will be used to explain the content of a light receiving element group in detail. A transparent portion 12 of the optical grid 11 of the glass scale and the valid light receiving portion 35 of the light receiving element 39-1 of the first array in the light receiving element group are made to match. By doing this, since the light receiving element 39-N of the first array next to the light receiving element 39-1 has a light receiving element pitch $\underline{P}$ of 14 μm, when the glass scale 10 moves in the A direction by exactly 14 μm, the transparent portion 12 of the optical grid 11 of the glass scale and the valid light receiving portion 35 match. Therefore, this light receiving element 39-N is designated as the light receiving element 39-15. Further, since the adjoining light receiving element 39-M is two pitches away, that element is at a position 28 μm from the light receiving element 39-1, but the pitch of the optical grid 11 of the glass scale 10 is 20 μm, so when the glass scale 10 moves by 8 μm, the transparent portion 12 of the optical grid 11 of the glass scale and the valid light receiving portion 35 match. Therefore, this light receiving element is designated as the light receiving element 39-9. In this way, if the number Q of the light receiving element 39-Q is increased by 14 at a time starting from 1 and the number Q of the light receiving element 39-Q is determined by the result of calculation by the module 20, there are 10 Qs, that is, 1, 15, 9, 3, 17, 11, 5, 19, 13, and 7.

The head light receiving element 39-Q of the second array is shifted by 1 μm with respect to the light receiving element 39-1, that is, the transparent portion 12 of the optical grid 11 and the valid light receiving portion 35 are shifted by 1 μm, so the light receiving element 39-Q becomes the light receiving element 39-2. This array starts from Q=2. If Q is increased by 14 at a time and the result of calculation by the module 20 (provided, however, that Q>0 is replaced by Q=Q−20), 10 Qs, that is, 2, 16, 10, 4, 18, 12, 6, 20, 14, and 8, are obtained. Therefore, the numbers from Q=1 to 20 all appear in each light receiving element group. Further, the number Q minus 1 corresponds to the amount of shift from the transparent portions 12 of the optical grid 11 of the glass scale 10, that is, the position shifted in the A direction of the direction of movement A-B of the glass scale 10.

The least common multiple of the 14 μm of the pitch $\underline{P}$ of the light receiving elements 39 and the 20 μm of the pitch $\underline{S}$ of the optical grid 11 is 140 μm. Therefore, it is understood that this group repeats every 140 μm. That is, it is understood that the head of the next group also becomes the light receiving element 39-1 and that it is at the same position relative to the optical grid 11 as the head light receiving element 39-1 of the previous group.

In this way, it is understood that the light receiving elements having the same number Q among the groups have the same amount of shift from the transparent portions 12 of the optical grid 11 of the glass scale 10 and that the outputs obtained by movement of the glass scale 10 are also the same. Therefore, 20 different types of output signals are obtained from the light receiving elements 39-1 to 39-20 for the 20 μm of the pitch $\underline{S}$ of the glass scale 10. Since the output signals are shifted by 1 μm increments, these signals may be processed to obtain signals expressing each 1 μm. This processing will be explained later.

The total area of one valid light receiving portion of a signal obtained in the above way and the total area of one valid light receiving portion of a signal obtained in FIG. 23 will be compared. In both cases, the overall size of the light receiving elements is set about the same to about 1600 μm×1600 μm. The area of the configuration of FIG. 23 is u μm×Ly μm×n (number)=64,000 μm², while the area of the seventh embodiment is 10×800 μm×11=88,000 μm². Therefore, according to the present invention, even if the overall size of the light receiving elements is the same, about 1.4 times the output is obtained.

In the seventh embodiment as well, in the same way as the fifth embodiment, since the light receiving elements having the same positional information are arranged dispersed and a large light receiving area is obtained, a large output signal is obtained and, even when the illuminance of the light source is uneven or spotty or when the glass scale is scratched or dirty, the effect is dispersed and averaged out by all of the light receiving elements of the positional information, so it is possible to prevent this from having a detrimental effect on the measurement precision.

Figure 26:
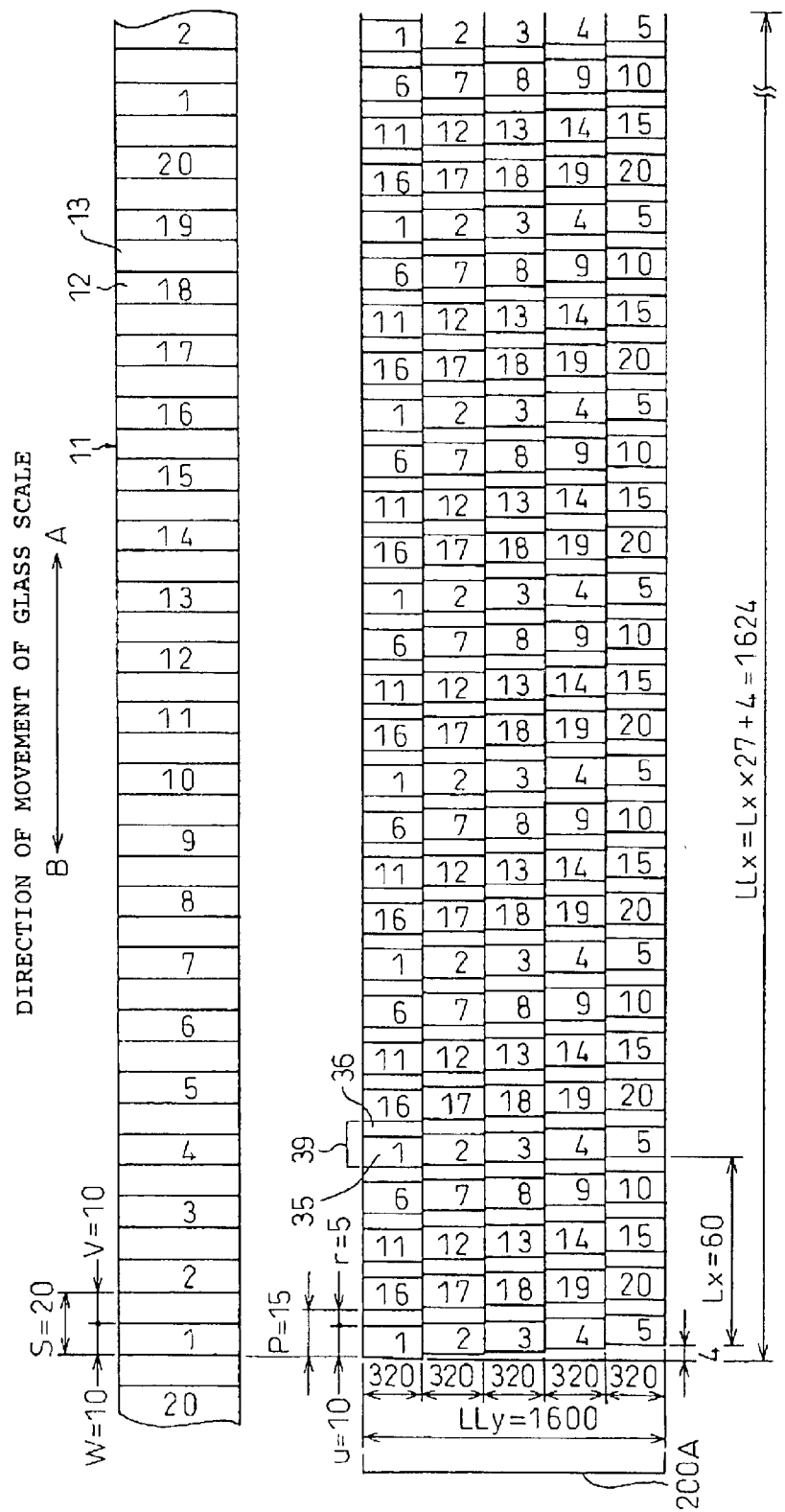
FIG. 26 is a view of an optical grid and light receiving element groups according to an eighth embodiment.

FIG. 26 shows the configuration of an eighth embodiment of the present invention. In the eighth embodiment as well, the positional relationships of the light source 1, glass scale 10, and board 20 are similar to the configuration explained in FIG. 21. In the eighth embodiment, however, as shown in FIG. 26, the configuration of the aggregate 200A of light receiving elements differs from the fifth embodiment.

FIG. 26 shows details of the optical grid 11 and the aggregate 200A of light receiving elements. In the eighth embodiment, 20 light receiving elements 39-1 to 39-20 (in the figure, shown by the numbers 1 to 20) form one group. Each group is comprised of the 20 light receiving elements arranged four in the direction parallel to the direction of movement A-B of the glass scale 10 and arranged five in the direction perpendicular to the direction of movement of the glass scale 10. Each array from the second array on is arranged shifted by 1 μm increments in the A direction of the direction of movement of the glass scale 10.

As will be understood from FIG. 26, each group is comprised of four light receiving elements 39 in the direction of movement A-B of the glass scale 10 and five arrays in the direction perpendicular to the direction of movement, that is, the total 20. The light receiving elements 39-1 to 39-20 are all of the same dimensions. In the eighth embodiment, 27 such groups are arranged in the direction of movement of the glass scale 10. The width $\underline{u}$ of the valid light receiving portion 35 of each light receiving element 39 is set to 10 μm in the same way as the width $\underline{W}$ of the transparent portion 12 of the optical grid 11, while the width $\underline{r}$ of the invalid light receiving portion 36 is set to 5 μm or smaller than the width $\underline{V}$ of the nontransparent portion 13 of the optical grid 11. Therefore, the pitch $\underline{P}$ of each light receiving element 39 is made 15 μm or smaller than the pitch $\underline{S}$ of the optical grid 11. Therefore, the length Lx of each light receiving element group in the lateral direction of movement of the glass scale 10 becomes 60 μm (=15 μm×5). Therefore, the length LLx of the aggregate 200A of light receiving elements 39 in the direction of movement of the glass scale 10 becomes 1624 μm (=60 μm×27+4 μm) since there are 27 light receiving element groups. Further, the length Ly of each light receiving element array is set to 320 μm, so the length LLy in the direction perpendicular to the direction of movement of the glass scale 10 is 1600 μm.

The eighth embodiment clearly also has the same effects as the previous embodiments. Note that the total area of one valid light receiving portion of a signal obtained in the eighth embodiment and the total area of one valid light receiving portion of a signal obtained in FIG. 23 will be compared. In both cases, the overall size of the light receiving elements is set about the same to about 1600 μm×1600 μm. The area of the configuration of FIG. 23 is 64,000 μm², while the area of the eighth embodiment is 10 μm×320 μm×27=86,400 μm². Therefore, according to the present invention, even if the overall size of the light receiving elements is the same, about 1.35 times the output is obtained.

Each array of the eighth embodiment is structured very similar to the third prior art explained above. That is, for a pitch $\underline{S}$ (=20 μm) of the optical grid 11, the pitch $\underline{P}$ of each light receiving element is set to 3×S/4=15 μm, the width $\underline{u}$ of the valid light receiving portion 35 to S/2=10 μm, and the width $\underline{r}$ of the invalid light receiving portion to S/4=5 μm.

In the prior art, however, there was only one of the arrays of the eight embodiment. That single array was broken down to 20 μm for the measurement, so the measurement precision was poor. In the eighth embodiment, however, five of these arrays are provided and the arrays are shifted by 1 μm increments, so 20 outputs are obtained by a single pitch of 20 μm in the measurement and therefore the precision is high.

Next, a ninth embodiment of the present invention will be explained using FIG. 27. In the ninth embodiment, the positional relationships of the light source 1, glass scale 10, and board 20 are similar to those of the configuration explained in FIG. 21. In the ninth embodiment, however, as shown in FIG. 27, the configuration of the aggregate 200A of light receiving elements differs from that of the sixth embodiment.

In the sixth embodiment explained in FIG. 24, the size of the light receiving elements 39 was set to a width $\underline{u}$ of the valid light receiving portions 35 of 10 μm, a width $\underline{r}$ of the invalid light receiving portions of 2 μm, and a length Ly in the longitudinal direction of 400 μm. Further, 20 light receiving elements arranged in four arrays of light receiving elements 39 shifted 1 μm each in the direction of movement of the glass scale formed one group. Twenty-seven of these groups were arranged in the direction of movement of the glass scale to form a single light receiving element group. Therefore, in the sixth embodiment, the length Ly of each group in the direction perpendicular to the direction of movement of the glass scale was 1600 μm, while the total length LLx of the aggregate 200A of the light receiving elements in the direction of movement of the glass scale was 1623 μm.

Figure 27:
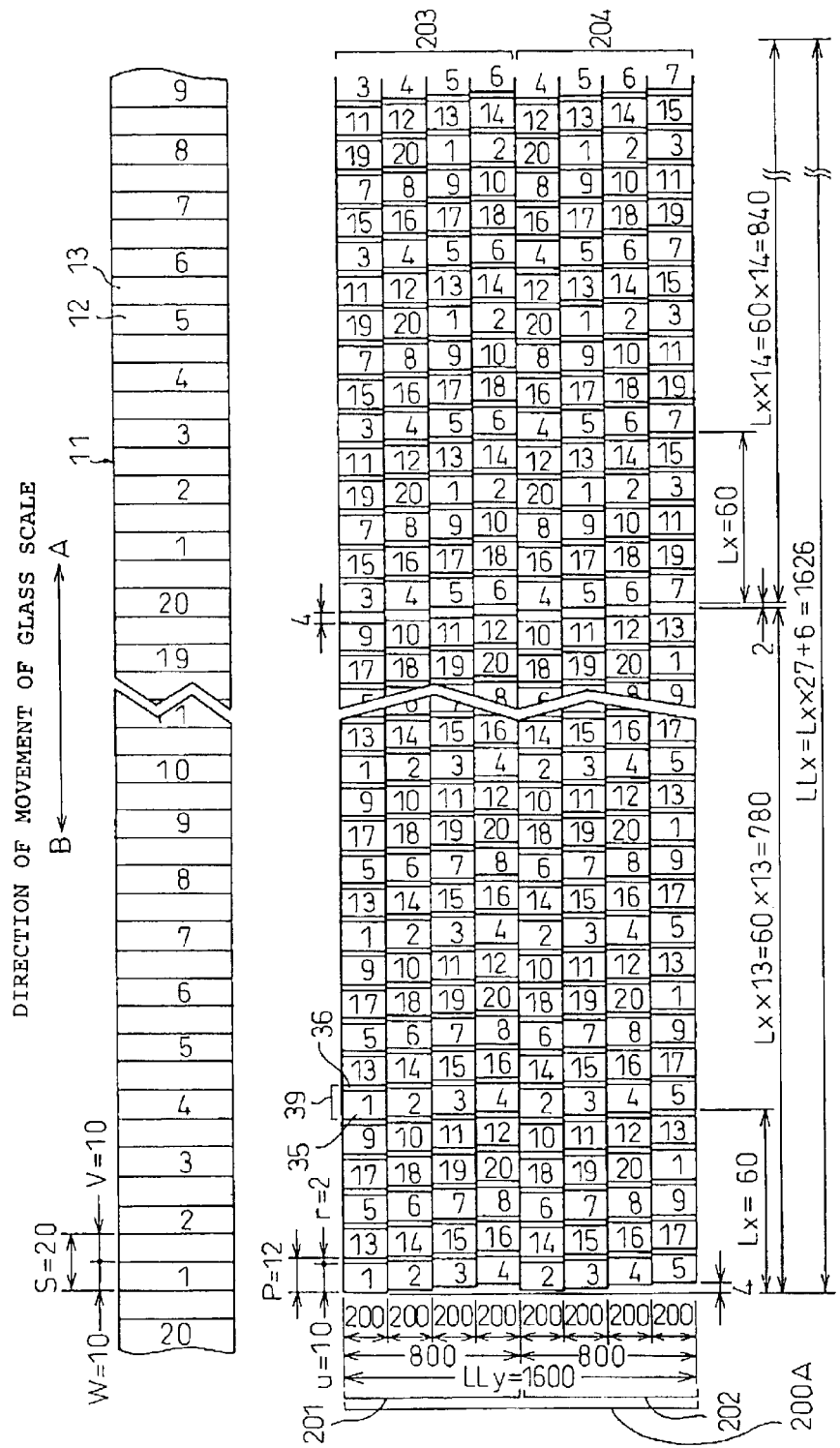
FIG. 27 is a view of an optical grid and light receiving element groups according to a ninth embodiment.

On the other hand, in the ninth embodiment shown in FIG. 27, the size of each light receiving element 39 is a width $\underline{u}$ of the valid light receiving portion 35 of 10 μm and a width $\underline{r}$ of the invalid light receiving portion of 2 μm, both the same, but the width Ly in the direction perpendicular to the direction of movement of the glass scale is set to 200 μm (half of the value of the sixth embodiment). Therefore, the length of each group in the direction perpendicular to the direction of movement of the glass scale is 800 μm. In the ninth embodiment, 13 of such groups are arranged in the direction of movement of the glass scale to form a light receiving element group 201.

Further, a light receiving element group of the same configuration as the light receiving element group 201 is arranged adjoining the light receiving element group 201 in the direction perpendicular to the direction of movement of the glass scale to form the light receiving element group 202. As a result, the total length of the aggregate 200A of light receiving element groups in the direction perpendicular to the direction of movement of the glass scale becomes 1600 μm. At that time, as shown in FIG. 27, the head light receiving element of the light receiving element group 202 is shifted by 1 μm in the A direction of the direction of movement of the glass scale 10 with respect to the light receiving element group 201.

If arranged in this way, it is understood that the head of the light receiving element group 202 is positioned shifted by 1 μm from a transparent portion 12 of the optical grid 11, is positioned the same relatively as the light receiving element 39-2 of the light receiving element group 202, and emits the same positional signal due to movement of the light receiving element group 11. Therefore, if numbers are assigned from the positions of the light receiving elements 39 of the light receiving element group 202 relative to the transparent portions 12 of the optical grid 11, the light receiving elements 39-1 to 39-20 are assigned as numbers 1 to 20 in the light receiving element group 202 such as shown in FIG. 27.

Further, the light receiving element groups 203 and 204 are arranged at positions adjoining the light receiving element groups 201 and 202 shifted by 2 μm increments in the A direction of the direction of movement of the glass scale 10. The light receiving element group 204 is shifted 1 μm in the A direction of the direction of movement of the glass scale 10 with respect to the light receiving element group 203. By arranging the groups in this way, it is understood that the head of the light receiving element group 203 is positioned shifted 2 μm with respect to a transparent portion 12 of the optical grid 11, is positioned the same relatively as with the light receiving element 39-3 of the light receiving element group 201, and emits the same positional signal. Therefore, if numbers are assigned from the positions of the light receiving elements 39 of the light receiving element group 203 relative to the transparent portions 12 of the optical grid 11, the light receiving elements 39-1 to 39-20 are assigned as the numbers 1 to 20 in the light receiving element group 203 as shown in FIG. 27.

Similarly, it is understood that the head of the light receiving element group 204 is positioned shifted 3 μm with respect to the transparent portion 12 of the optical grid 11, is positioned the same relatively as the light receiving element 39-4 of the light receiving element group 201, and emits the same positional signal. Therefore, if numbers are assigned from the positions of the light receiving elements 39 of the light receiving element group 204 relative to the transparent portions 12 of the optical grid 11, the light receiving elements 39-1 to 39-20 are assigned as the numbers 1 to 20 in the light receiving element group 204 as shown in FIG. 27.

If arranged in this way, the size of the aggregate 200A of the light receiving element groups in the ninth embodiment becomes a length LLx in the direction of movement of the glass scale of 1626 μm and a length LLy in the direction perpendicular to the direction of movement of the glass scale of 1600 μm. In this way, in the ninth embodiment, the size becomes substantially the same as in the sixth embodiment (length LLx in direction of movement of glass scale is just 3 μm larger).

If arranging the groups as in the ninth embodiment, however, for example, if taking note of the light receiving elements 39-1 arranged at the same positions relatively and emitting the same signal for movement of the glass scale 10, the overall light receiving area is the same. In FIG. 24, what was divided in the first array is distributed among the second, third, and fourth arrays as well so it is understood that they are distributed more broadly.

That is, the configuration of the ninth embodiment is equivalent to the aggregate 200A of light receiving element groups shown in FIG. 21 comprised of the four light receiving element groups 201 to 204 like the light receiving element group 200 explained in FIG. 12. Therefore, in this embodiment as well, it is understood that an even greater effect is obtained.

In the ninth embodiment, the explanation was given using the arrangement of the light receiving element arrays shown in FIG. 24 for the groups of light receiving elements in the four light receiving element groups 201 to 204, but it is clear that similar effects are obtained even if using the groups explained in FIG. 25 and FIG. 26 for the groups of light receiving elements in the four light receiving element groups 201 to 204.

Finally, a 10th embodiment of the present invention will be explained using FIG. 28. In the 10th embodiment, the positional relationships of the light source, glass scale 10, and board 20 are similar to those in the configuration explained in FIG. 21. In the 10th embodiment, however, as shown in FIG. 28, the configuration of the aggregate 200A of light receiving elements differs from those of the previous embodiments.

In the 10th embodiment, the pitch $\underline{S}$ of the optical grid 11 of the glass scale 10 is set to 8 μm, the width $\underline{W}$ of the transparent portion 12 of the optical grid 11 is set to 4 μm, while the width V of the nontransparent portion 13 of the optical grid 11 is set to 4 μm. The width u of the valid light receiving portion 35 of each light receiving element 39 is set to 4 μm in the same way as the width W of the transparent portion 12 of the optical grid 11, while the width r of the invalid light receiving portion 36 is set to 3 μm or smaller than the width V of the nontransparent portion 13 of the optical grid 11.

The aggregate 200A of the light receiving elements is comprised of a plurality of light receiving elements 39-1 to 39-8. The eight light receiving elements 39-1 to 39-8 arranged in a direction parallel to the direction of movement A-B of the glass scale form one group. The light receiving elements 39-1 to 39-8 all have the same dimensions. Twenty-eight of such groups are arranged in the direction of movement of the glass scale (FIG. 28 shows only part of them). Further, one light receiving element 39 is arranged in the direction perpendicular to the direction of movement A-B of the glass scale.

The length Lx of each light receiving element group in the lateral direction becomes 56 μm (=7 m×8). Therefore, the length LLx of the aggregate 200 of light receiving elements 39 in the direction of movement of the glass scale becomes 1568 μm (=56 μm×28) since there are 28 light receiving element groups. Further, the length LLy of each light receiving element array is set to 1600 μm.

A transparent portion 12 of the optical grid 11 of the glass scale and the valid light receiving portion 35 of the light receiving element 39-1 in the light receiving element group are made to match. By doing this, since the light receiving element 39-N next to the light receiving element 39-1 has a light receiving element pitch P of 7 μm, when the glass scale 10 moves in the A direction by exactly 7 μm, the transparent portion 12 of the optical grid 11 of the glass scale and the valid light receiving portion 35 match. Therefore, this light receiving element 39-N is designated as the light receiving element 39-8. Further, since the adjoining light receiving element 39-M is two pitches away, that element is at a position 14 μm from the light receiving element 39-1, but the pitch of the optical grid 11 of the glass scale 10 is 8 μm, so when the glass scale 10 moves by 6 μm, the transparent portion 12 of the optical grid 11 of the glass scale and the valid light receiving portion 35 match. Therefore, this light receiving element 39-M is designated as the light receiving element 39-7.

In this way, if the number Q of the light receiving element 39-Q is increased by 7 at a time starting from 1 and the number Q of the light receiving element 39-Q is determined by the result of calculation by a module 8 (provided, however, that Q>8 is replaced with Q=Q–8), the numbers from Q=1 to 8 all appear in each group of the light receiving elements as shown in FIG. 28. Further, the number Q minus 1 corresponds to the amount of shift from the transparent portions 12 of the optical grid 11 of the glass scale 10, that is, the position shifted in the A direction of the direction of movement A-B of the glass scale 10.

The least common multiple of the pitch P (=7 μm) of the light receiving elements 39 and the pitch S (=8 μm) of the optical grid 11 is 56 μm. Therefore, it is understood that this group of the light receiving elements 39 repeats every 56 μm. That is, it is understood that the head of the next group also becomes the light receiving element 39-1 and that it is at the same position relative to the optical grid 11 as the head light receiving element 39-1 of the previous group.

In this way, it is understood that the light receiving elements having the same number Q in the groups have the same amount of shift from the transparent portions 12 of the optical grid 11 of the glass scale and that the outputs obtained by movement of the glass scale 10 are also the same. Therefore, eight different types of output signals are obtained from the light receiving elements 39-1 to 39-8 for the pitch S (=8 μm) of the glass scale 10. Since these eight different types of output signals are shifted in phase corresponding to 1 μm each, these signals may be processed to obtain signals expressing each 1 μm. This processing will be explained later.

In this way, in the 10th embodiment, similar effects as in the fifth embodiment are obtained. Since it is possible to arrange 28 groups in the direction of movement of the glass scale, the light receiving area becomes 1.12 times greater and a sufficiently dispersed arrangement is obtained. In the 10th embodiment, however, since the pitch p of the optical grid 11 is 8 μm, eight signals for each 1 μm are obtained. The processing will be explained using FIG. 17.

The flow of the signals will be explained using FIG. 17 and taking as an example the light receiving element 39-1. Assume that the glass scale 10 and the light receiving element 39-1 are in the positional relationship shown in FIG. 28. That is, assume that the transparent portions 12 of the glass scale 10 and the valid light receiving portions 35 of the light receiving elements 39 match. At this time, the signals obtained from the light receiving elements 39 become maximum. The signal obtained by adding the signals from all of the light receiving elements 39-1 also becomes maximum. When the glass scale 10 moves in the direction of movement A, the nontransparent portions 13 of the glass scale 10 gradually cover the valid light receiving portions 35 of the light receiving elements 39, so the outputs become smaller. When the glass scale 10 moves by exactly ¼ of the pitch S, the outputs become ½ of the maximum output, while when it moves by exactly ½ of the pitch S, the portions are completely covered and the outputs become the minimum output. When the glass scale 10 moves further and moves by ¾ of the pitch S, the outputs return to ½ of the maximum output. When moving by exactly 1 pitch S, the maximum outputs are again obtained.

The same is true for the other light receiving elements, but since the light receiving element 39-2 is positioned shifted 1 μm with respect to the light receiving element 39-1, the output become maximum 1 μm delayed with respect to the light receiving element 39-1. In addition, the outputs of the light receiving elements 39-3 to 39-8 become maximum shifted 1 μm from each other. This relationship is shown by the signals I31 to I38 in FIG. 17. In the figure, the signal I31 is the output signal of the light receiving element 39-1, while the signals I32 to I38 correspond to the signals from the light receiving elements 39-2 to 39-8.

If converting the signals to digital values using a comparator having a threshold value of (maximum output–minimum output)/2, the results are the digital signals J31 to J38 in FIG. 17. Here, the signal J31 is the signal I31 converted to a digital value and inverts at (maximum output–minimum output)/2. The signals J32 to J38 correspond to the signals I32 to I38.

Further, the digital signals J31 to J38 are converted to two signals KA and KB comprised of $$A = J31 \cdot J37 + J33 \cdot J35$$

$$B = J32 \cdot J38 + J34 \cdot J36$$

by a logical operation circuit. The timings of the rising edges and trailing edges of the signals KA and KB are shown in FIG. 17. As will be understood from FIG. 17, one cycle of the signal I31 is equal to the pitch S, that is, 8 μm, of the glass scale, so the distance from the rising edge or the trailing edge of the signal KA to the trailing edge or rising edge of the signal KB becomes exactly 1 μm. If counting the number of the rising edges or trailing edges of the signals KA and KB, the result is eight per cycle. By displaying these, it is possible to use this as a measuring device. Further, for discriminating the direction of movement of the glass scale 10, if taking note of the rising edge of the signal KB, when the direction of movement is A, the signal KA becomes "1", while when the direction of movement is B, the signal KA becomes "0", so discrimination is possible.

Here, the explanation was given with reference to a pitch P of the optical grid 11 in the 10th embodiment of 8 μm, but it is clear that a signal is obtained for each 1 μm by similar processing even in the case of a pitch P of the optical grid 11 explained in the fifth embodiment to ninth embodiment of 20 μm.

As explained above, according to the fifth to 10th embodiments, since the width of the valid light receiving portion of each light receiving element is larger than the width of the invalid light receiving portion, the area of the valid light receiving portion of the light receiving element at the portion struck by light can be made larger, resistance is given against noise, and a detrimental effect on the measurement precision can be prevented.

Further, since there are a plurality of light receiving elements having specific positional information or there are a plurality of light receiving element arrays comprised of pluralities of light receiving elements having that specific positional information, and the plurality of light receiving element arrays having that specific positional information are dispersed at a plurality of locations, even when the illuminance of the light source is uneven or spotty or when the glass scale is scratched or dirty, the effect is suffered a bit by all of the light receiving elements of the positional information and averaged out, so it is possible to prevent any detrimental effect on the measurement precision.

What is claimed is:

1. An optical displacement measurement apparatus comprising a displaceable first member having an optical grid of scale pitch D, a light source for emitting light of a wavelength λ to said first member, and a light receiving element unit for receiving light passing through said first member, wherein a distance between said first member and said light receiving element unit is set to $(2 \times D^2)/2\lambda$ and said light receiving element unit is comprised of light receiving element groups.

2. An optical displacement measurement apparatus serving as a photoelectric transmission type linear encoder comprising a light source for emitting light of a wavelength λ, a first member comprised of a moving scale having a grid pitch D, and a light receiving element unit, wherein a distance between the first member and the light receiving element unit is set to $(2 \times D^2)/2\lambda$.

3. An optical displacement measurement apparatus as set forth in claim 1 or 2, wherein said light source is comprised of an LED and a condenser lens and said light receiving element unit is a photodiode masked at the same pitch as said first member.

4. An optical displacement measurement apparatus as set forth in claim 1 or 2, wherein said light source is comprised of an LED and a condenser lens and said light receiving element unit is comprised of a photodiode divided into two, is masked by the same pitch and line width as said first member, and has the divided portions arranged shifted by ¼ pitch from each other.

5. An optical displacement measurement apparatus as set forth in claim 1 or 2, wherein said light receiving element unit is comprised of two CCDs and the CCDs are arranged shifted by ¼ pitch of said first member.

* * * * *